(12) United States Patent
Georgiev

(10) Patent No.: US 7,360,030 B1
(45) Date of Patent: Apr. 15, 2008

(54) METHODS AND APPARATUS FACILITATING VOLUME MANAGEMENT

(75) Inventor: Ivan I. Georgiev, Sofia (BG)

(73) Assignee: Sanbolic, Inc., Watertown, MA (US)

( * ) Notice: Subject to any disclaimer, the term of this patent is extended or adjusted under 35 U.S.C. 154(b) by 229 days.

(21) Appl. No.: 11/114,943

(22) Filed: Apr. 26, 2005

Related U.S. Application Data

(60) Provisional application No. 60/576,082, filed on Jun. 1, 2004.

(51) Int. Cl.
*G06F 12/00* (2006.01)

(52) U.S. Cl. .................. 711/141; 711/152; 711/154; 711/163; 711/221; 707/9

(58) Field of Classification Search .................. 707/9; 711/147–153, 141, 154, 163, 221
See application file for complete search history.

(56) References Cited

U.S. PATENT DOCUMENTS

| | | | |
|---|---|---|---|
| 5,623,660 A * | 4/1997 | Josephson | 707/9 |
| 6,178,487 B1 * | 1/2001 | Ruff et al. | 711/165 |
| 6,185,666 B1 * | 2/2001 | Murray et al. | 711/173 |
| 6,493,804 B1 * | 12/2002 | Soltis et al. | 711/152 |
| 6,718,436 B2 * | 4/2004 | Kim et al. | 711/114 |
| 6,754,656 B1 * | 6/2004 | Cornwell et al. | 707/8 |
| 6,981,117 B2 * | 12/2005 | Patel et al. | 711/163 |

\* cited by examiner

*Primary Examiner*—Stephen C. Elmore
(74) *Attorney, Agent, or Firm*—Chapin IP Law, LLC; Paul P. Kriz, Esq.

(57) ABSTRACT

Methods facilitating management of shared volumes of logical storage, residing on one or more disks in a shared storage system, are accessible by multiple computers. A coherent view of the shared storage is provided by assigning unique identifiers to each managed disk, physical partition, partition set, and volume; and by describing a volume as a logical tree of partitions; when computer needs to modify a volume configuration it temporarily disables all computers' access to the modified shared disks and performs the changes. Efficient shared volume input/output handling is provided by minimizing number of requests directed toward each storage unit using page aligned buffers and transfer offsets. Per computer and per user access control is provided by storing a security descriptor for each shared volume, when user or computer access has to be enforced the security identifier of the user or machine is checked against the security descriptor for needed rights.

23 Claims, 17 Drawing Sheets

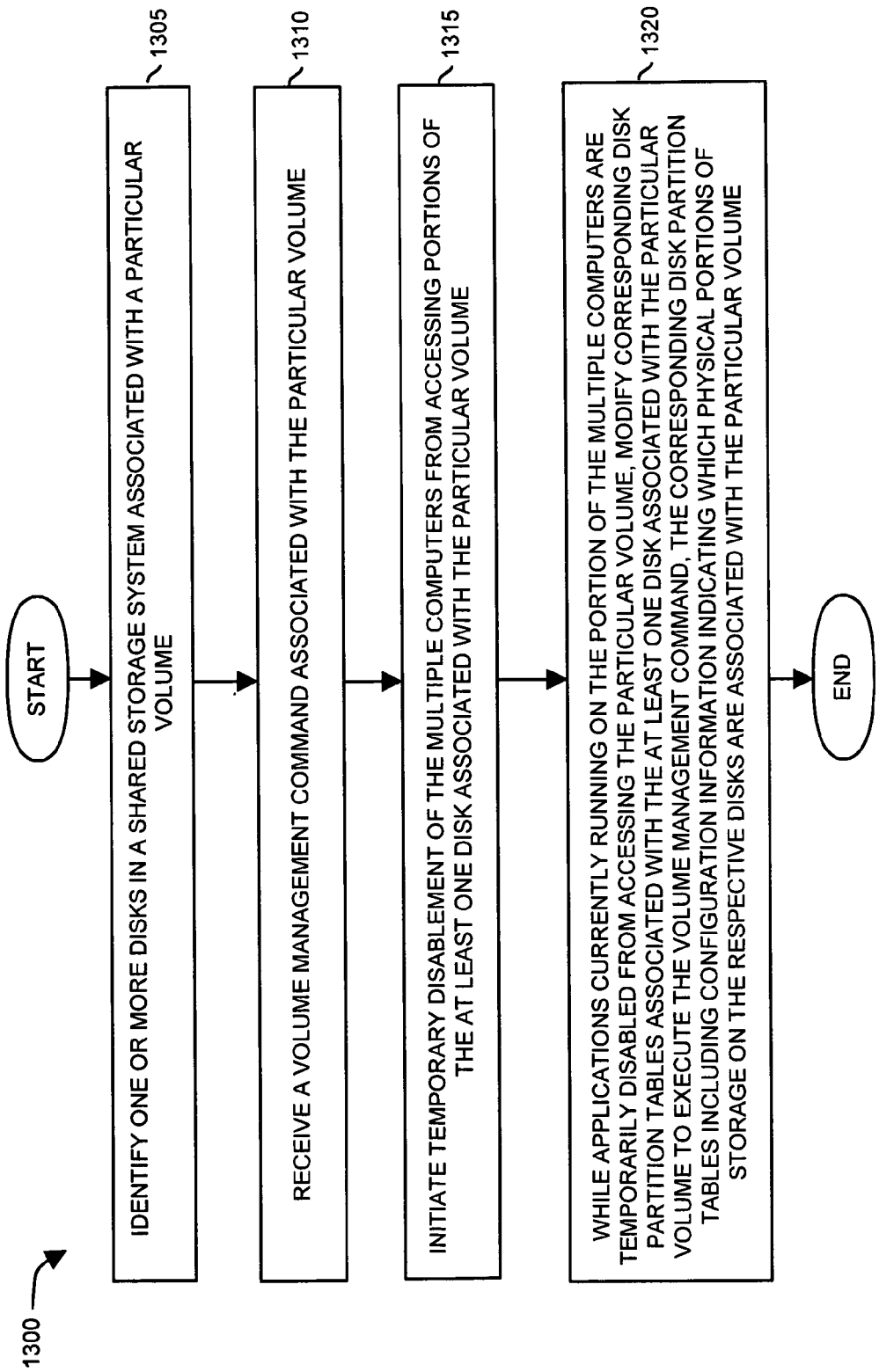

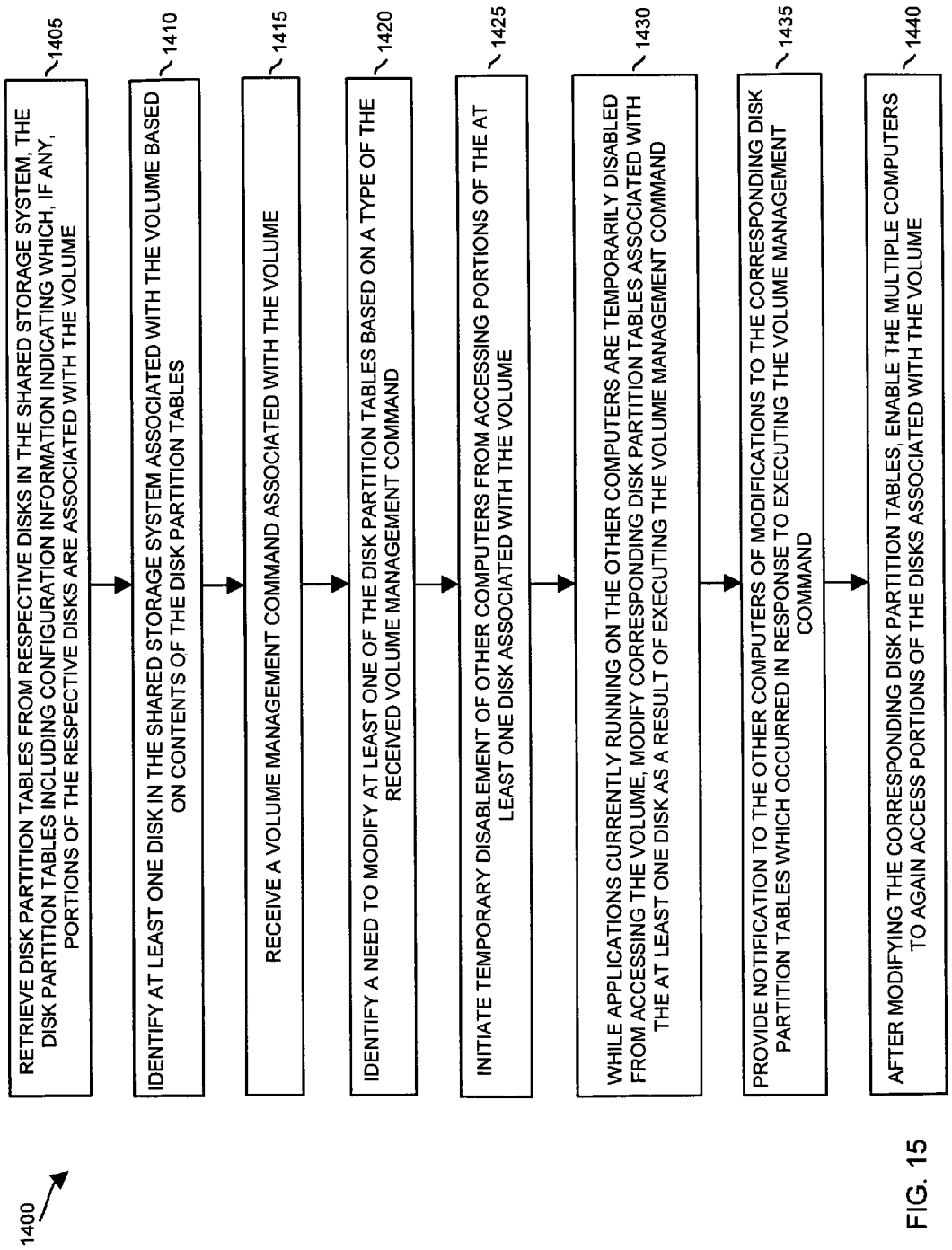

METHODS AND APPARATUS FACILITATING VOLUME MANAGEMENT

RELATED APPLICATIONS

This application claims the benefit of U.S. Provisional Application No. 60/576,082 entitled "METHODS AND APPARATUS SUPPORTING SHARED USE OF STORAGE," filed on Jun. 1, 2004, the entire teachings of which are incorporated herein by this reference. This application is also related to:

i) co-pending U.S. patent application Ser. No. 11/114,905 entitled "METHODS AND APPARATUS FACILITATING ACCESS TO SHARED STORAGE AMONG MULTIPLE COMPUTERS," describing functionality associated with transaction management, ii) co-pending U.S. patent application Ser. No. 11/115,041 entitled "METHODS AND APPARATUS FOR SHARED STORAGE JOURNALING," describing functionality associated with journaling, iii) co-pending U.S. patent application Ser. No. 11/114,913 entitled "METHODS AND APPARATUS FACILITATING ACCESS TO SHARED STORAGE AMONG MULTIPLE COMPUTERS," describing functionality associated with cluster management, iv) co-pending U.S. patent application Ser. No. 11/115,098 entitled "METHODS AND APPARATUS FACILITATING ACCESS TO STORAGE AMONG MULTIPLE COMPUTERS," describing functionality associated with opportunistic locks among computers in a cluster, all of which have been filed on the same date as the present application, the entire teachings of which are also incorporated herein by this reference.

BACKGROUND

In certain conventional applications, computer systems sometimes include one or more processors and corresponding software applications that support access to corresponding externally attached storage. For example, according to certain conventional applications, multiple computers may couple to and communicate with a common shared storage system that stores large volumes of data. Depending on access configuration information associated with the shared storage system, two or more computers may be afforded access to a common volume of the shared storage system.

As briefly discussed, a volume is a storage resource associated with a shared storage system in which one or multiple computer users store data for corresponding applications. Shared storage systems typically include many volumes. Each volume appears as a single logical storage entity to respective users even though the volume typically comprises logical storage partitions from multiple disks in the shared storage. For example, a given volume in the shared storage may be defined to include different portions (e.g., partitions) of physical storage on one or multiple disks in the shared storage. Partitions of the physical storage associated with a volume need not be contiguous with each other. Thus, the physical storage of the volume can be randomly located on each of multiple different disks in the shared storage system. Mapping techniques (which are transparent to the user) enable users to access the appropriate data from disks of the shared storage when they retrieve a corresponding file stored in the file system mounted on the volume.

Most shared storage applications include a conventional software application enabling administrators to manage which users in a computer system are able to access different volumes in the shared storage.

SUMMARY

Conventional computer applications that support access to volumes in a shared storage system suffer from a number of deficiencies.

According to such conventional applications, there is no communication nor is there coordination among multiple distributed computers amongst each other to prevent data corruption. This can be quite limiting to users. For example, data corruption can occur due to unsynchronized writes over the same area of shared storage (e.g., modified partition tables) by different computers. Volume descriptions can be lost if two or more machines overwrite them at the same time. When a volume description (metadata) is lost, all the data residing on the volume will be lost too. Further, if a computer running such software modifies a partition table on a shared disk the other computers using the same disk won't be aware of the changes. Shared storage partition table modification can be performed safely if all computers using the shared storage are shutdown during the modification, with the exception of the computer performing the modification. In other words software providing shared storage coherent view to all computers accessing the shared system is needed.

In contradistinction to conventional methods, embodiments of the invention enable a volume management application (e.g., a shared volume manager) running on each of one or more computers (which have access to a shared storage system) to provide a coherent view of shared volumes by temporarily preventing access to the modified metadata (e.g., a disk partition table including configuration information) associated with one or more volumes/partition/partition set and, if necessary, to corresponding volumes, while configuration information associated with the modified volumes/partition/partition set is being modified. Users may modify contents of a volume retrieved from a shared storage system while an administrator modifies the volume's metadata (configuration).

In a specific embodiment of the invention, a given computer (having a network connection to communicate with other computers on a network and an interface to access contents of the shared storage system) is one of multiple computers having access to a shared storage system. The given computer runs a volume manager application that manages a volume of logical storage (e.g., physical storage on one or multiple disks) associated with the shared storage system. The volumes associated with the shared storage are accessible by multiple computers in a cluster of computers having access to the shared storage system. The cluster can include multiple computers having corresponding volume manager applications running on them, each of which may access and modify configuration information on the disks.

During a process of volume management, the volume manager retrieves disk partition tables from respective disks in the shared storage system. The disk partition tables include configuration information indicating which if any portions of the respective disks are associated with the volumes residing in the shared storage. In other words, a volume is a configuration of physical storage partitions from multiple disks in the shared storage system. Several physical partitions can be coupled together in a partition set. A partition set is an entity defining input output behavior of the set of its members. Partitions set types include: 1) a volume set 2) a stripe set (e.g., RAID 0) 3) a mirror set (e.g., RAID 1) 4) RAID 5, etc. A partition set can be a member of another partition set. A volume is the operating system's representation of a storage entity.

The volume manager identifies one or more disks in the shared storage system associated with a volume based on contents of the disk partition tables.

The volume manager receives volume management commands associated with a volume/partition/partition set. The volume manager also provides efficient handling of all the input/output of the shared volumes it manages.

Example commands supported by the volume manager according to embodiments of the invention include: creating a physical partition on a disk, creating a stripe set or a volume set or a mirror out of two or more physical partitions/stripe sets/volume sets/mirror sets, the set members doesn't have to be of a same kind (for example a physical partition can be striped/mirrored or participate in a volume set with second member stripe set and third member volume set), creating a volume on top of a physical partition/stripe set/volume set/mirror set, deleting a physical partition/stripe set/volume set/mirror set/volume, setting up user access rights on a volume, setting up machine access rights on a volume, etc.

Based on receipt of a volume management command, the volume manager identifies a corresponding need to modify at least one of the disk partition tables (e.g., disk partition tables associated with the modified volume/partition/partition set). In one embodiment, as discussed, a disk partition table includes metadata identifying to which volume each partition (e.g., portion of storage) of the corresponding disk pertains.

In order to provide a consistent view of the shared volumes to all computers accessing the shared storage in the course of executing the command, the volume manager initiates temporary disablement of corresponding computers from accessing the partition tables of disks associated with the volume/partition/partition set and, if needed, from accessing portions of the disks associated with the modified volume/partition/partition set. The computers, previously having access to the volume, have mounted the file system on the volume by a corresponding operating system. Thus, while applications currently running the computers are temporarily disabled from accessing the volume, the volume manager modifies corresponding partition tables associated with one or more disks associated with the affected volume as a result of executing the volume management command. After modifying the corresponding disk partition tables, the volume manager initiates (e.g., via communications) re-enablement of the multiple computers so they can again access portions of the disks associated with the modified volume/partition/partition set. Thus, a coherent view of the storage is provided to the computers accessing it. All computers in the cluster need not shut down their applications in order to modify a volume/partition/partition set structure. Additionally, multiple computers running corresponding volume manager applications can concurrently modify one or more volumes/partition/partition set without interference.

In one embodiment, the volume manager provides notification to the computers (which have access to a volume) of the modifications to the corresponding disk partition tables occurring in response to executing a volume management command, so all computer see identically the shared volumes.

The volume manager application and corresponding techniques as described herein can be used in enterprise and high performance storage environments such as SANs (Storage Area Networks) including RAID (Redundant Arrays of Inexpensive Disks) type storage configurations. Based on previously discussed embodiments and potentially further embodiments, the volume manager application herein can be applied to and/or extended to support concepts such as advanced locking for volume management, volume management for faster and less interrupted access to files, complete SAN-NAS integration, maintenance of volumes associated with disks in shared storage, etc. The volume management techniques also herein are used in conjunction with other components such as the transaction manager, journaling, cluster manager, oplock in order to provide a coherent view of the shared storage to all computers accessing it. Principles discussed in these related applications can be employed to exploit the volume manager of the present application.

More general embodiments of the present application include a technique of facilitating management of one or more volumes/partition/partition set associated with a shared storage system. For example, a volume manager in a computer system having access to disks in a shared storage system (e.g., a SAN) identifies at least one disk in a shared storage system associated with a volume/partition/partition set. The volume manager can receive volume management commands associated with volumes/partitions/partition sets. In response to receiving a volume management command, the volume manager initiates temporary disablement of computers from accessing portions of the disks associated with the volume. While applications currently running on the computers are temporarily disabled from accessing the volume or its metadata, the volume manager modifies corresponding disk partition tables associated with the disks in shared storage associated with the volume to execute the volume management command. The corresponding disk partition tables include configuration information indicating which physical portions of storage on the respective disks are associated with the volume/partition/partition set. In accordance with this embodiment, a volume manager can modify a volume configuration on the fly while other users appear to have uninterrupted access to the volume and related metadata in the shared storage system.

In other embodiments, the volume manager scans multiple disks in the shared storage system. For example, the volume manager retrieves partition tables from respective disks in the shared storage system. The partition tables identify which portions of a respective disk are associated with a given volume. As mentioned, a respective partition table can identify each of multiple volumes to which disk a volume stores its data. In one embodiment, the partition tables in respective disks of the shared storage system include respective tree structures of configuration information. Each tree structure identifies how one or more physical partitions of a respective disk map to a volume or a root partition set. Thus, a combination of one or more disk partition tables identifies how physical partitions of the disks are associated with the volumes in the shared storage system.

The volume manager classifies each of the multiple disks as either managed or unmanaged. For example, from the perspective of a volume manager having access to the shared storage system, managed disks are those disks governed by the volume manager and the unmanaged disks are the disks governed by other volume managers.

As a result of scanning partition tables from respective disks in shared storage, the volume manager identifies which disks in the shared storage have at least one physical partition associated with a given volume. Because there are potentially many disks in the shared storage system, it is quite possible that a volume is associated with only a portion of disks in the shared storage system.

Based on input from a user or administrator, the volume manager receives a volume management command associated with a volume/partition/partition set. To execute the command, the volume manager initiates temporary disablement of the multiple computers from accessing portions of the at least one disk associated with the volume.

While applications currently running on the computers are temporarily disabled from accessing the volume, the volume manager modifies corresponding disk partition tables of disks associated with the volume to execute or carry out the volume management command. As discussed, the corresponding disk partition tables associated with the disks and volume include configuration information indicating which physical portions of storage on the respective disks are associated with the volume.

In one embodiment, when modifying a volume configuration the volume manager disables access to disk partition tables associated with the volume in a sequential order (e.g., an ascending order) based on unique identifiers associated with each disk to prevent deadlock.

In another embodiment, prior to modifying the corresponding disk partition tables associated with the at least one disk, the volume manager applies any changes to respective disk partition tables in local memory of given computer prior to writing changes to the corresponding disk partition tables in the shared storage system. This enables the volume manager making the changes to check whether any such changes will be effective if applied to disk partition tables in respective disks of the shared storage.

In one embodiment, the volume manager provides efficient shared volume input/output handling includes enhancing data transfer rate on multiple disks by minimizing number of requests directed toward each storage unit (e.g. partition set/physical partition) using page aligned buffers and transfer offsets. By minimizing the number of requests directed toward each storage unit, the disk is relieved from processing many small requests and an enhanced data transfer is achieved as the each disk is processing a single request, containing the data of all the small requests.

In another embodiment, the volume manager provides per computer access control to each volume by assigning a security identifier on each computer accessing the shared storage and storing a security descriptor along with each volume. The volume manager defines access rights that a computer needs in order to access a given volume. The security descriptor contains access control lists determining what access rights each computer (e.g. security identifier associated with each computer) has or does not have on the given volume. When a computer tries to access a shared volume the computer security identifier is checked against the volume security descriptor.

In one embodiment, the volume manager provides user access control to each shared volume. A user needs to possess certain volume management rights, defined by the volume manager in order to perform a volume management command. Along with each shared volume a security descriptor is stored defining user access rights to the given volume. Each user has a security identifier assigned from the operating system. When a user tries to perform a volume management command associated with a given shared volume the user security identifier is checked against the volume security descriptor for having the needed rights to perform the specified volume management command.

Thus, according to embodiments of the invention, techniques recited herein allow concurrent management of a given volume as well as additional volumes associated with the shared storage system. For example, a given disk in the shared storage system can be partitioned to store data for multiple volumes. While access by a portion of computers to a given volume associated with a disk is disabled, other computers can access other volumes associated with the given disk. In other words, an access lockout from a given volume on a disk for a certain set of computers does not restrict another set of computers form accessing other volumes associated with the given disk during the access lockout.

Techniques discussed herein are well suited for use in applications in which multiple computers in a networked computer system communicate (e.g., arbitrate negotiate, coordinate, compete, etc.) amongst each other to coordinate access to the same regions (e.g., a volume) of shared storage. The techniques of locking out other computers having current access to a volume in shared storage is well suited for enabling a volume manager or multiple volume managers to coordinate amongst each other and update configuration information (e.g. provided a consistent view of the shared storage to all computers accessing it) associated with the shared volumes unbeknownst to the users. After updating the configuration information users are enabled to access the volume again.

It should be noted that embodiments of the invention are well suited for applications other than those discussed above and thus are not limited to such use.

One embodiment of the invention includes one or multiple computerized devices (e.g., a host computer, workstation, etc.) configured to support the aforementioned method operations disclosed herein as embodiments of the invention to manage volumes in a shared storage system. In such an embodiment and related embodiments, a computerized device includes a display, a memory system, a processor (e.g., a processing device) and an interconnect (e.g., electronic circuitry such as a data bus, data transfer circuit, etc.).

The interconnect of the computerized device supports local communications among the display, the processor and the memory system. The computerized device also includes a network interface supporting communications with other computers and an interface to access contents of a shared storage system. The memory of the computerized device is encoded with a corresponding volume manager application that, when executed on the processor, produces a corresponding volume manager process. The volume manager application as well as other related functions supports all of the method embodiments and operations explained herein as embodiment of the invention.

Yet other embodiments of the invention disclosed herein include software programs to perform the method embodiment and operations summarized above and as further disclosed in detail below under the heading Detailed Description of Preferred Embodiments. More particularly, a computer program product (e.g., a computer-readable medium) including computer program logic encoded thereon may be executed on a computerized device to support operations and techniques as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD- ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention.

One embodiment of the invention is directed to a computer program product that includes a computer readable medium having instructions stored thereon for supporting management of storage resources (e.g., volumes) among multiple computers. The instructions, when carried out by a processor of the first data communication device, cause the processor to perform the steps of: i) identifying at least one disk in a shared storage system associated with a volume associated with the shared storage system; ii) receiving a volume management command associated with the volume; iii) initiating temporary disablement of the multiple computers from accessing portions of the at least one disk associated with the volume; and iv) while applications currently running on the portion of the multiple computers are temporarily disabled from accessing the volume, modifying corresponding disk partition tables associated with the at least one disk associated with the volume to execute the volume management command, the corresponding disk partition tables including configuration information indicating which physical portions of storage on the respective disks are associated with the volume. Other arrangements of embodiments of the invention that are disclosed herein include software programs to perform any of the method embodiment steps and operations summarized above and disclosed in detail below.

Accordingly, methods herein facilitate management of shared volumes of logical storage residing on one or more disks in a shared storage system. The volumes are accessible by multiple computers. A coherent view of the shared storage is provided to the multiple computers or corresponding users by assigning unique identifiers to each managed disk, physical partition, partition set, and volume, and by describing a volume as a logical tree of partitions. When a computer needs to modify a volume, the configuration herein temporarily disables all computers' access to the modified shared disks and performs the changes. Efficient shared volume input/output handling is provided by minimizing a number of requests directed toward each storage unit using page aligned buffers and transfer offsets. Per computer and per user access control is provided by storing a security descriptor for each shared volume. When a user or computer access has to be enforced, the security identifier of the user or machine is checked against the security descriptor for needed rights.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 14 is a flowchart illustrating operations according to an embodiment of the invention.

FIG. 15 is a flowchart illustrating operations according to an embodiment of the invention.

DETAILED DESCRIPTION OF EMBODIMENTS

According to one embodiment, a volume manager in a computer having access to contents of disks in a shared storage identifies at least one disk in a shared storage system associated with a volume. A volume comprises of a physical partition s from one or multiple disks in the shared storage system. The volume manager receives a volume management command associated with the volume. In response to receiving the volume management command, the volume manager initiates temporary disablement of computers from accessing disk partition tables (e.g., metadata identifying a hierarchical tree and mapping of a volume to shared storage) and/or other portions of the disks associated with the volume. While applications currently running on the computers are temporarily disabled from accessing the volume, the volume manager modifies corresponding partition tables associated with the disks in shared storage associated with the volume to execute the volume management command. The corresponding disk partition tables include configuration information indicating which physical portions of storage on the respective disks are associated with the volume.

Figure 1:
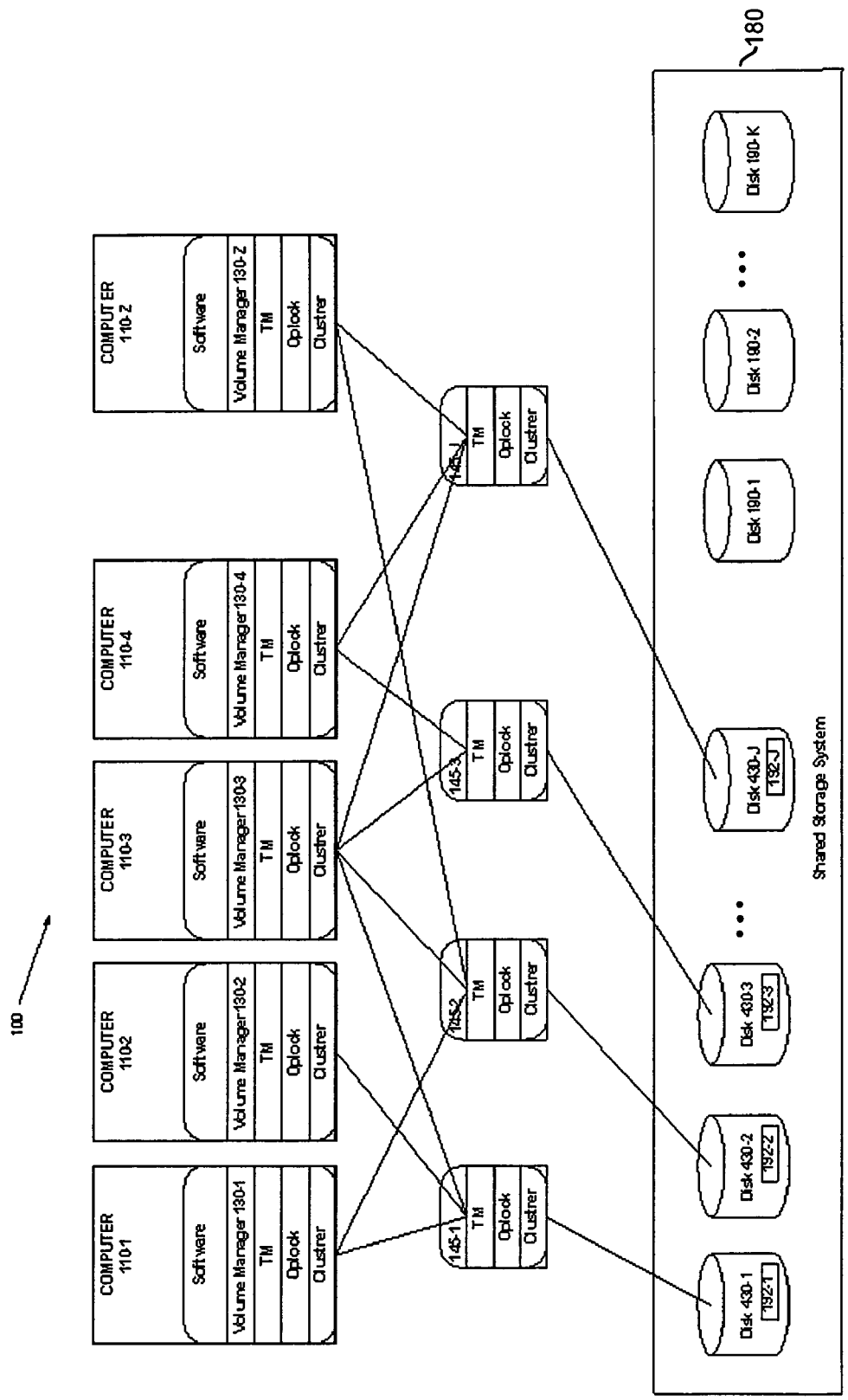
FIG. 1 is a block diagram of a shared storage system architecture according to an embodiment of the invention.

FIG. 1 illustrates a system 100 (e.g., network environment) suitable for explaining an operation of example embodiments of the invention. As shown, system 100 includes cluster 145-1 including computers 110-1 and 110-2 having access to the shared disk 430-1, cluster 145-2 including computers 110-1, 110-3, 100-Z having access to the shared disk 430-2, cluster 145-3 including computers 110-3 and 110-4 having access to the shared disk 430-3, cluster 145-J including computers 110-3, 110-4, 100-Z having access to the shared disk 430-J, and shared storage system 180 including storage disk 190-1 and storage disk 430-2, . . . storage disk 430-J. Each storage disk 190-1 . . . 190-Y is not governed by the volume manager 130. Each storage disk 430 is governed by the volume manager 130 and stores application data content as well as respective disk partition tables 192-1, 192-2, . . . , 192-J. Each of the computers 110 includes a respective volume manager 130-1, 130-2, . . . , 130-Z (e.g., a distributed software application) in addition to functionality discussed in related applications such as a respective oplocks manager; transaction manager, journal manager, cluster manager, etc.

In general, cluster managers associated with computers 110 and associated with volume managers 130 enable computers 110, in a distributed manner, to manage which computers 110 shall be maintained or included in a cluster 145. Shared storage system 180 includes regions accessible by computers 110 for retrieving and storing information. For example, computers 110-1, 110-2, and 110-3 access volume 200-2 (see FIG. 2), which maps to three regions on disks 430-1 and 430-2 of shared storage system 180. In one embodiment, the shared storage 180 includes one or more mechanical mechanisms to access disk media (e.g. spinning disk storage media) for storing digital information. Shared storage 180 may also be configured as recording tape media and/or electrically addressable memory such as RAM, ROM, EEPROM, etc. The disks 430 are partitioned to store data information.

Computers 110 (which form cluster 145) communicate over network 150 (e.g., a TCP/IP network) to coordinate access to a volume 200 (or portions thereof) in the shared storage system 180. In one embodiment, each cluster 145 in system 100 can access or mount a common volume 200 in the shared storage 180. Thus, multiple remotely located computers 110 with respect to the shared storage 180 can access a volume or parts thereof at the same time.

System 100 can include multiple clusters of one or more computers, each having access to a different disk in shared storage 180, providing disk portions—physical partitions that can be organized in partitions sets associated with respective volumes. The transaction managers of computers 110 manage the execution of transactions (such as reads and writes of volume manager metadata) associated with each of the shared disks accessible to a given computer for the address ranges in the unified address space of the respective shared disk.

Each computer 110 in a cluster employs an oplock manager to manage access rights in the unified address space (such as access rights over the respective disk partition table 192 mapped in unified address space).

In one embodiment, the shared storage 180 is a Storage Area Network (SAN) accessible by computers 110 via links. Links from the computers 110 to the shared storage 180 provide a wide bandwidth channel (e.g., a channel having high bandwidth) capable of transferring (in either direction) a large amount of data in a short period of time. However, even though a link (e.g., fiber channel) itself may be quite fast, the actual latency associated with accessing data in the shared storage 180 can be quite long due to, at least in part, the time it takes to access one or more disks in the shared storage 180 storing the data of interest.

In one embodiment, one, some or all computers 110 in the cluster 145 have full read/write access to portions of the shared storage 180. As discussed, computer members of the cluster 145 synchronize among themselves in order to read/write to overlapping regions and, more particularly, disk partition tables 192 of the shared storage 180, thus not corrupting shared disk partition tables 192 and having a coherent view of the shared storage. In certain cases, cluster member computers 110 exchange information to support further data processing.

The exchange of information and coordination of which volume manager 130 is allowed to access portions of the shared storage 180 typically occurs over a secondary channel or communication link (e.g., network 150 such as the Internet, Intranet, LAN, WAN, etc.) that is designated for exchanging commands and for data synchronization between machines (e.g., computers in a cluster). According to one embodiment, the communication link such as network 150 for communicating between computers in a cluster 145 is a TCP connection over Ethernet. Bandwidth associated with the TCP connection may be quite limited. However, such connections typically have a relatively low latency.

In one embodiment, system 100 includes computers 110 that form multiple different clusters, each of which has access to a corresponding volume in shared storage 180.

As discussed, a cluster 145 includes a set of computers 110, which cooperate with each other to access shared storage 180. In one embodiment, a cluster 145 in system 110 is built around a common shared storage system 180 that provides input data to be processed by computers in the cluster 145. Data processed and generated by the computers 110 in the cluster 145 is generally read from and thereafter written back to shared storage 180. Memory in computers 110 provide a local region to modify the contents retrieved from shared storage 180. Accordingly, multiple computers 110 can retrieve a common portion of shared storage 180, modify the data locally in memory, and then write modified data back to the shared storage by competing amongst one another for exclusive access to the shared storage 180. In this way, multiple computers 110 in a cluster 145 can virtually modify data in the shared storage 180 at the same time even though they have write access rights at different times.

Accordingly, an embodiment of the invention includes a volume manager 130 in a respective computer 110 having access to contents of disks 430 in shared storage 180 identifies at least one disk 430 in a shared storage system 180 associated with a volume 200. The volume 200 comprises physical partitions 220 (e.g., storage regions) from one or multiple disks 430 in the shared storage system 180. The volume manager 130 receives a volume management command associated with the volume. The volume management command can be generated internal or external to the volume manager 130.

In response to receiving the volume management command, the volume manager 130 initiates temporary disablement of computers 110 from accessing disk partition tables 192 (e.g., metadata identifying a hierarchical tree and mapping of a volume to shared storage 180) and/or other portions of the disks 430 associated with the modified volume. In one embodiment, while applications currently running on the computers 110-2 and 110-3 are temporarily disabled from accessing the volume and its application data content as well as disk partition tables 192, the volume manager 130-1 modifies corresponding disk partition tables 192 associated with the disks 430 in shared storage 180 associated with the volume to execute the volume management command. The command is first analyzed to identify appropriate modifications to disks 190 in the shared storage system 180. The corresponding disk partition tables 192 include configuration information indicating which physical portions of shared storage 180 on the respective disks 430 are associated with the volume.

Figure 2:
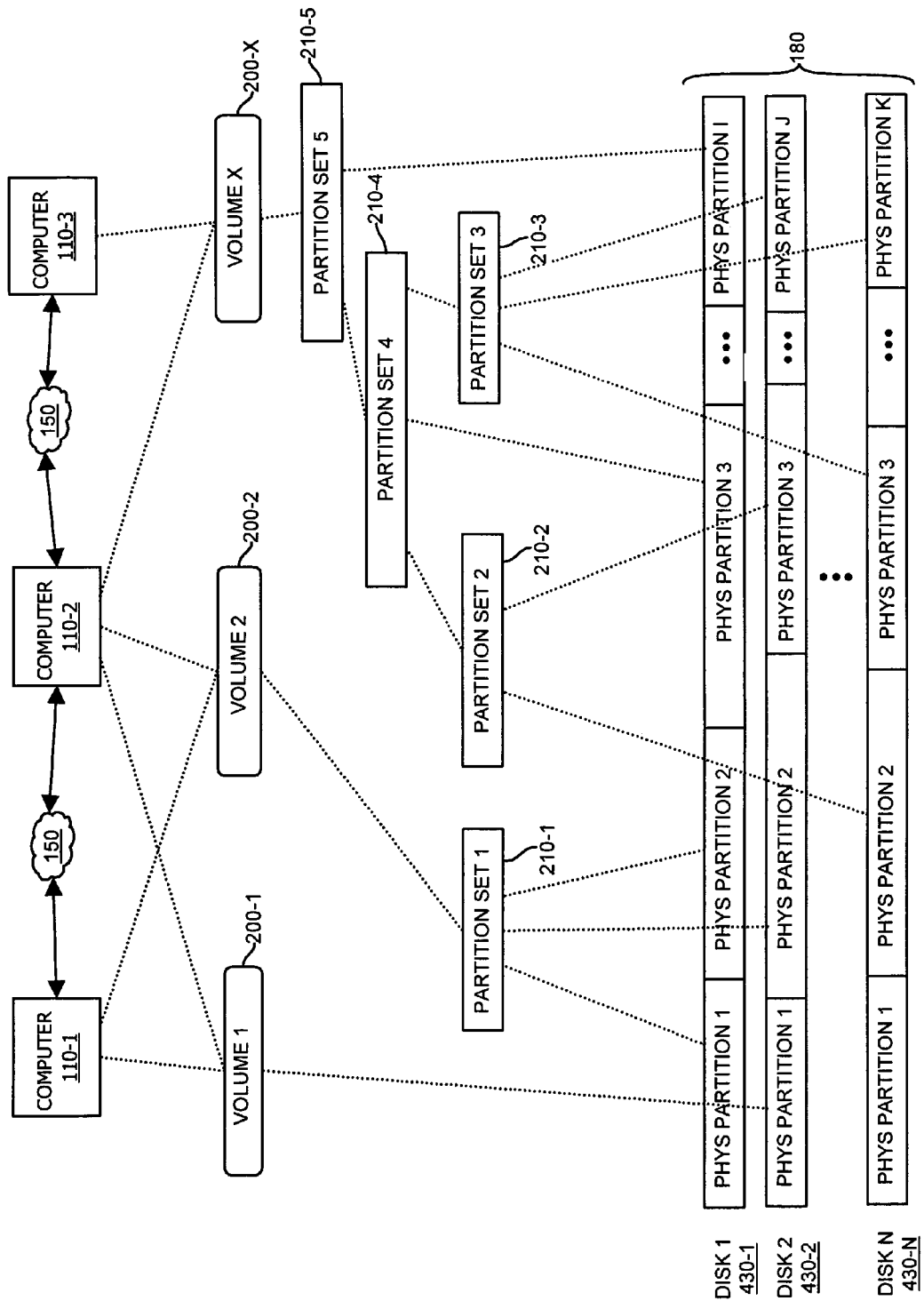
FIG. 2 is a block diagram illustrating how portions of multiple disks comprise corresponding volumes according to an embodiment of the invention

FIG. 2 is a diagram illustrating multiple computers having access to contents of shared storage system 180 according to an embodiment of the invention. Since shared storage system 180 such as a SAN is part of shared storage environment 200, each computer 110 has access to a disk 430 (e.g., disk1, disk 2, . . . disk n) and corresponding volumes 200 (e.g., volume 1, volume 2, . . . volume X) defined by physical partitions 220, possibly organized in partition sets 210 on respective disks 430, etc. Based on execution of the volume manager 130 and related applications such as the cluster manager, op locks manager, etc. each of the computers 110 in a cluster 145 are aware of other computers 110 having access to the same storage resource such as disk partition tables 192. Thus, when one computer initiates a change to one or more disk partition tables 192 of shared storage system 180, other computers 110 in the cluster 145 can register the change after the computer initiating the change modifies the disk partition tables 192. Thus, a consistent view of the shared storage is provided to all computers accessing it.

As shown, computer 110-1 and computer 110-2 have access to volume 1. Volume 1 maps to physical partition 1 of disk 2 where application data can be stored and accessed.

Computer 110-1, computer 110-2, and computer 110-3 have access to volume 2. Volume 2 maps to partition set 1, which further maps to respective physical partition 1 and 2 of disk 1 and physical partition 2 of disk 2. These physical partitions on disk 1 and disk 2 are thus reserved for storing data accessible by computer 110-1, computer 110-2, and computer 110-3.

In a similar manner as discussed above and as shown in FIG. 2, computer 110-2 and computer 110-3 have access to volume X. Volume X maps to partition set 5. Partition set 5 maps to partition set 4 as well as physical partition i of disk 1. Partition set 4 maps to partition set 2, physical partition 3 of disk 1, and partition set 3. Partition set 2 maps to physical partition 2 of disk n and physical partition 3 of disk 2. Finally, partition set 3 maps to physical partition j of disk 2 and physical partitions 3 and k of disk n. In this way, volumes, partition sets, and physical partitions form a hierarchy.

As discussed, the aggregation of computers 110 having access to a volume in the shared storage system 180 is called a cluster 145. The cluster managers (e.g., a software component running on each computer in the cluster as discussed in related applications) manage information about computers joining and leaving the cluster 145. The transaction manager (e.g., another software component) provides the ability to apply disk changes atomically. The transaction manager also provides a Unified Address Space (UAS) for the disks of information (e.g., byte addresses 0 though $2^{128}$-1) to access contents of the shared storage 180 and, more particularly, the disk partition tables 192. This is shown more particularly in FIG. 8.

The aggregation of computers 110 having access to one or more disks 190 managed by the volume manager 130 is a cluster 145. For each disk 190 managed by a volume manager 130, there are a corresponding disk cluster manager and a transaction manager running in the computer 110 associated with the volume manager 130.

In one embodiment, the volume manager 130 is implemented as a kernel mode device driver that runs on all computers or machines in the cluster 145. Thus, in one respect, the volume manager 130 and its functionality are distributed amongst multiple computers 110 in the cluster 145 that communicate amongst each other to access the disk partition tables 192. The unit on which an OS (Operating System of a given computer 110) mounts a corresponding file system is called a volume, which comprises physical partitions, and partition sets as discussed.

In general, disks 430 are split in multiple slices called physical partitions. Partitions residing on any disk 430 in the shared storage 180 can be combined in a partition set to form volumes of different sizes. A volume can comprise a physical partition or a partition set. In one embodiment, the volume manager 130 supports several types of partition sets—volume set, stripe set (RAID 0), mirror (RAID 1) and RAID 5.

Members of a partition set can be physical partitions and/or partition sets, thus allowing various combinations for volume growth, fault tolerance or performance improvement.

After a volume manager 130 is started on a respective computer 110 in the cluster 145, the volume manager 130 scans all disks 190 present in the shared storage system 180. The volume manager 130 then divides the disks 190 of shared storage 180 into two sets: a set of managed disks 430 and set of unmanaged disks 420. In one embodiment, the volume manager 130 registers with a Plug & Play Manager and monitors the subsequent addition and removal of disks from the shared storage system 180. When a new disk 190 appears in the shared storage system 180, the disk 190 is categorized to which set it belongs.

Figure 4:
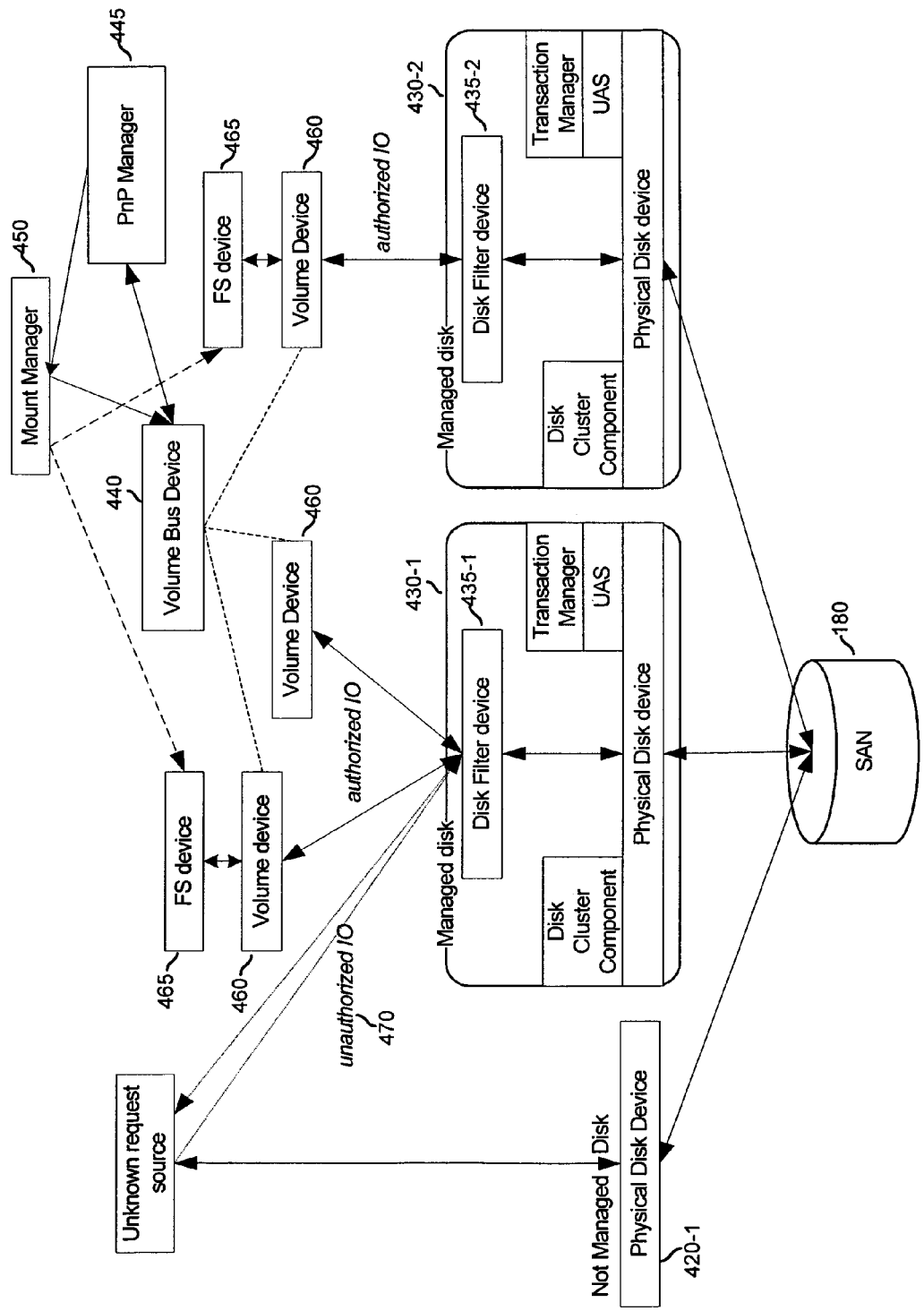
FIG. 4 is a general architecture of the discussed volume manager and it's interactions with a respective Operating System according to an embodiment of the invention.

As shown in FIG. 4, a disk filter device 435 is associated with each disk 190 in the managed disk set 430. The disk filter device 435 prevents and therefore disables unauthorized disk operations. In one embodiment, each request 470 not coming from the volume manager 130 (e.g., the volume manager device driver) is unauthorized.

The unmanaged disk set 420 consists of disks 190 governed by other volume managers. The unmanaged disks 420 (e.g., disks 190 not governed by the volume manager 130) are tracked by the volume manager 130 because a user may decide to assign some of them for use by the respective volume manger 130.

When a volume is encountered, the volume bus device 440 produces a new volume PDO 460 and notifies the PnP Manager 445 of the device detection. The PnP Manager 445 notifies mount manager 450, which initiates a file system 465 mount procedure onto the new volume 460.

Disk Manage Notification

When a user of a respective computer 110 commands the volume manager 130 to start managing a new disk 420, the volume manager utilizes a 'format' routine to format the disk 420. Formatting the new disk 420 involves writing initial system structures to the disk. If the 'format' routine is successful, the volume manager 130 broadcasts a message to other computers 110 in the cluster 145 to rescan all not managed disks 420 for new managed disks 430. Thus, other members having access to the shared storage system 180 can be made aware of newly added and initialized disks 430 of shared storage 180.

Disk Unmanage Notification

When a user commands a respective volume manager 130 to stop managing a disk 430, the action is applied cluster wide so that all computers 110 in the cluster 145 stop managing the disk 430. In one embodiment, this is achieved by taking an exclusive cluster lock and overwriting the volume manager identification information on the disk 430. The exclusive cluster lock forces all other members 110 out of the cluster 145. New members 110 are not allowed to enter the cluster 145, so just a single computer 110 has access to the disk 430. The volume manager 130, being the exclusive cluster lock owner overwrites volume manager identification information and detaches itself from the respective disk 430. The next time a computer 110 running a volume manager 130 sees the disk drive 190-420, such a volume manager 130 will not recognize the disk 190-420 as being managed.

Figure 3:
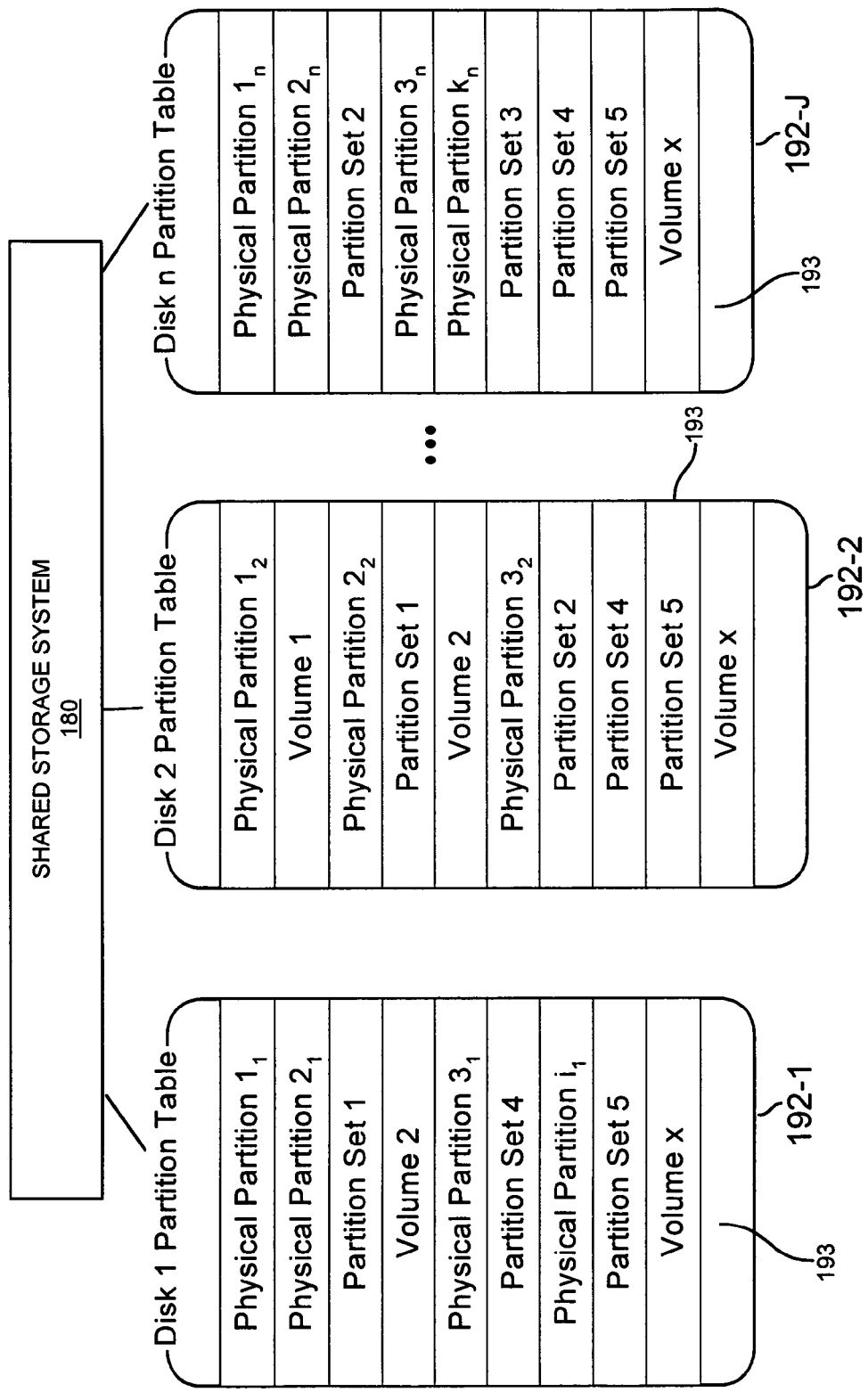
FIG. 3 is a diagram of disk partition tables according to an embodiment of the invention.

FIG. 3 is a diagram of disk partition tables 192 according to an embodiment of the invention. As shown, each disk partition table 192 associated with a respective disk 430 includes a hierarchy of information associated with the disk 430. The information includes physical partitions 220 and partition sets 210 associated with a respective volume 200.

Disk Layout

On each managed disk 430, the volume manager 130 reserves some space for its metadata. This space is used as an allocation pool for volume manager 130 subsystems such as:

Journals—disk space reserved for Journal subsystem, which is used by Transaction Manager to recover consistent state after a power failure or a crash.

Partition Table 192—storing configuration information about volumes 200, physical partitions 220 and partition sets 210; it is read and written using Transaction Manager.

Volume's Security Descriptors—storing user and machine rights on a respective volume 200

The information stored on each disk by the volume manager (e.g. its metadata) has to be organized in a way that allows all computers reading it to build an identical view of the shared storage.

Partition Table 192 Format

As shown in FIG. 3, each disk 430 has an associated disk partition table 192 that stores configuration information (metadata) about volumes 200, physical partitions 220 and partition sets 210. A partition table 192 is an array of partition table entries 193. Each entry 193 describes a volume 200, a physical partition 220 or a partition set 210. Each physical partition 220 has only one partition table entry 193 on the partition table 192 on the disk 430 it resides. The disk partition tables 192 are stored in respective disks 430 of shared storage 180. In one embodiment, there is one disk partition table 192 for each disk 430 in shared storage 180.

Each volume 200 and each partition set 210 has one partition table entry 193 on every disk 430 that contains one or more of its (volume 200 or each partition set 210) members. A volume 200/partition set 210 can be viewed as a tree structure (a volume 200/partition set 210 is the root; physical partitions 220 are the leaves of the hierarchical tree; partition sets 210 are the tree nodes). Each disk partition table 192 includes information about the path from each leaf (physical partition 220) to the root of the tree in which it is associated. Collectively, the disk partition tables 192 define a hierarchical tree for each volume 200 and its corresponding partition sets 210 and physical partitions 220 associated with the shared storage system 180.

Each volume 200, physical partition 220, and partition set 210 has an associated UUID (Universal Unique Identifier). A respective UUID is used for identification purposes and is assigned at the creation of the corresponding element (e.g., volume 200, partition 220 or partition set 210).

Partition table entry 193 format:

```
struct partition
{
  typedef unsigned short count;
  enum type { PHYSICAL=0xA, VIRTUAL, VOLUME_TYPE, DELETED=0xDD };
  enum relation { NONE, MOUNTABLE_VOLUME, VOLUME_SET, STRIPE_SET,
  SIMPLE_MIRROR, RAID_5 };
  typedef object::sized_enum<unsigned char, type>      type_byte;
  typedef object::sized_enum<unsigned char, relation>  relation_byte;
  typedef unsigned short generation;
    type_byte       _type;           /* partition type - PHYSICAL or VIRTUAL */
    relation_byte   _relation;       /* relation with other parent_members */
    vol_man::guid   _uuid;           /* partition uuid */
    vol_man::guid   _parent_uuid;    /* parent uuid */
    count           _index;          /* index in parent_members */
    generation      _generation;     /* increased on each modification */
    union
    {
      struct having_length
      {
        union
        {
          struct
          {
            unsigned __int64 _start;
          } _physical;
          struct having_members
          {
            count _members; /* total members count */
            union
            {
```

-continued

Partition table entry 193 format:

```
    struct { } _volume_set;
    struct
    {
      memory::chars _stripe_size;
    } _stripe_set;
    struct
    {
      unsigned short _bytes_per_sector; /* max form all members bps */
      UUID _master;
    } _mirror;
    struct { } _raid_5;
    };
  } _complex;
  } _kind;
  unsigned ___int64 _length;
} _part;
struct
{
  struct security_descr
  {
    unsigned ___int64 _node_descr;
    unsigned short    _size;
  } _security_descr;
  wchar_t _gobal_drv_letter;
} _mountable_volume;
} _params;
};
```

Volume/Physical Partition/PartitionSet Address Space

Each shared disk has own Unified Address Space 800 sized $2^{128}$, where are mapped:

- the disk's physical space $2^{64}$; it's mapped in a predetermined region
- address spaces ($2^{64}$ each) for all of the physical partitions, residing on the disk
- address spaces ($2^{64}$ each) for all of the partition sets/volumes, having at least one physical partition, residing on the disk Each physical partitions 220 has it's own address space 810 (sized as $2^{64}$ contiguous addresses in one embodiment) in the disk UAS 800 (Unified Address Space). Aspects of the UAS 800 are discussed further in related applications. The start point in the address space 800 (UAS) is determined by the partition's index in the disk partition table 192 on the respective disk 190. For example:

start=partition_index_in_table<<64;
end=start+$2^{64}$

Figure 8:
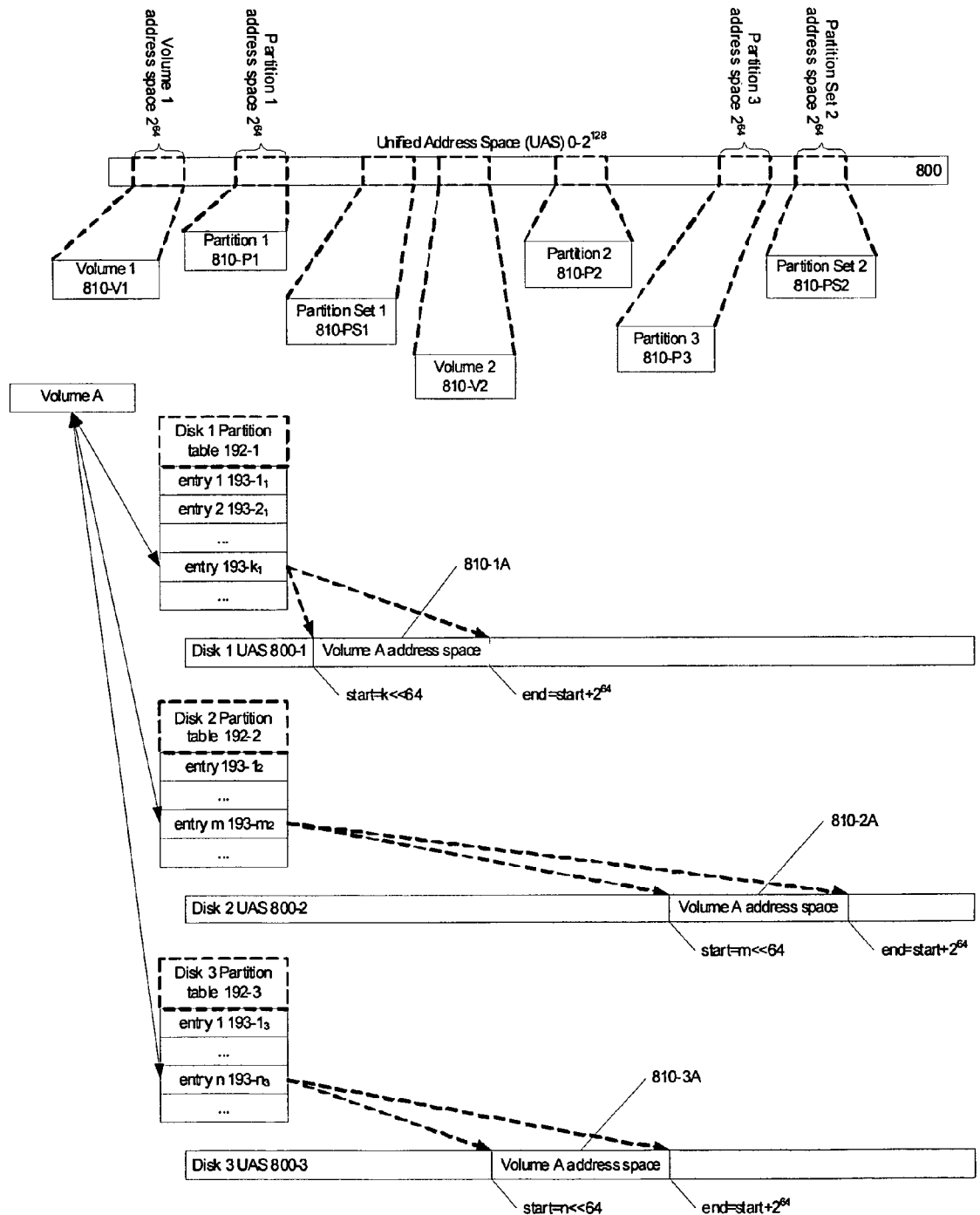
FIG. 8 is a block diagram illustrating the mapping of a volume address space in the unified address spaces of the disks on which the volume resides according to an embodiment of the invention.

A Volume 200/PartitionSet 210 having members on several disks 430 is described in each disk partition table 192 and has an address space 810 on each disk 430 it resides. The address space 810 boundaries on each disk 430 are determined by the Volume 200/PartitionSet 210 entry 193 index in the partition table 192 (as shown in FIG. 8). When a region is to be acquired on a volume 200/partition set 210, a separate lock is generated for each disk 430 containing the volume 200/partition set 210 address space 810.

These mappings allow all computers to negotiate changes of each storage unit. When a change is made by a computer having access to the shared storage all other computers can act accordingly in order to provide a coherent view of the shared storage unit through all computers accessing it.

Figure 5:
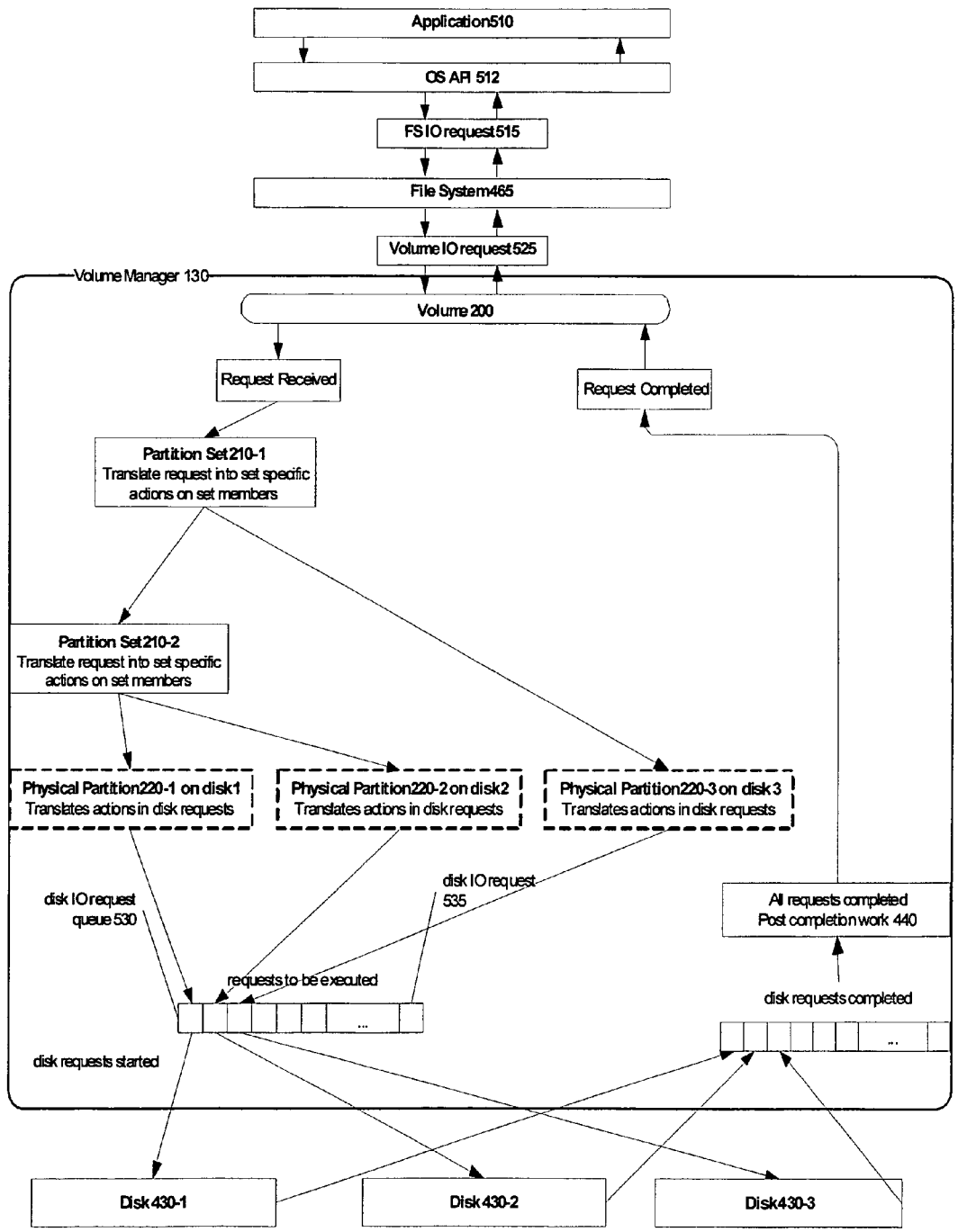
FIG. 5 is a flow diagram illustrating execution of a input/output request according to an embodiment of the invention.

FIG. 5 is a diagram illustrating an example input/output flow according to an embodiment of the invention. As shown, application 510 in a given computer 110 generates a file system input/output request 515 from a corresponding user. The application 510 uses OS API 512, which creates a file system input/output request 515 to the file system 465. The file system 465 translates the file system input/output request 515 in to one or more volume input/output requests 525 and forwards them to the volume 200 on which the file system 465 is mounted.

The sample volume 200 on FIG. 5 consists of the partition set 210-1, which consists of partition set 210-2 and the physical partition 220-3. The partition set 210-2 consists of physical partition 220-1 and physical partition 220-2. The physical partitions 220-1, 220-2 and 220-3 reside respectively on disks 430-1, 430-2 and 430-3. The volume 200 passes down the volume input/output request 525 in to the partition set 210-1. The volume 200 translates the request in an action performed on the partition set 210-1.

Actions on the partition sets (210-1 and 210-2) result in to number of set specific actions on the set members. The actions performed on physical partitions result in series of disk input/output requests 535. The disk input/output requests 535 are gathered in an input/output request queue 530 and started in parallel toward the underlying disks 430-1, 430-2 and 430-3. When all the disks 430-1, 430-2 and 430-3 complete the requests directed to them, post completion work 540 is done; it (540) determines the final outcome of the volume input/output request 525.

Session

In one embodiment, when a user makes modifications on disks 430 managed by the volume manager 130, the user groups the changes 720 into sessions 710. FIG. 7 is a diagram illustrating a session 710 according to an embodiment of the invention. As shown, a session 710 is a group of transactional user modifications 720 (e.g., actions) that are applied to each of multiple disks 430 and appear atomic to the user. If two or more sessions 710 are applied simultaneously (on a single computer 110 or several computers 110 in the same cluster 145), there will be only one session 710 running at a time. This is achieved by initiating a session's Lock Phase 620 (phases of a session are discussed below with respect to FIG. 6). If there are two or more logically conflicting sessions 710 running simultaneously, only one will succeed. For example, the first session 710 that acquires the locks over disk partition table's areas 192 on the modified by the session disks 430 will succeed while the others will fail. This type of conflict will be discovered during Prepare Phase 610 or Probe Phase 630. When a session 710-x fails, because of session 710-y applied at the same time, the user can see the modifications of the session 710-y and correct the session 710-x1 actions, so the next time session 710-x1 apply is successful.

Figure 6:
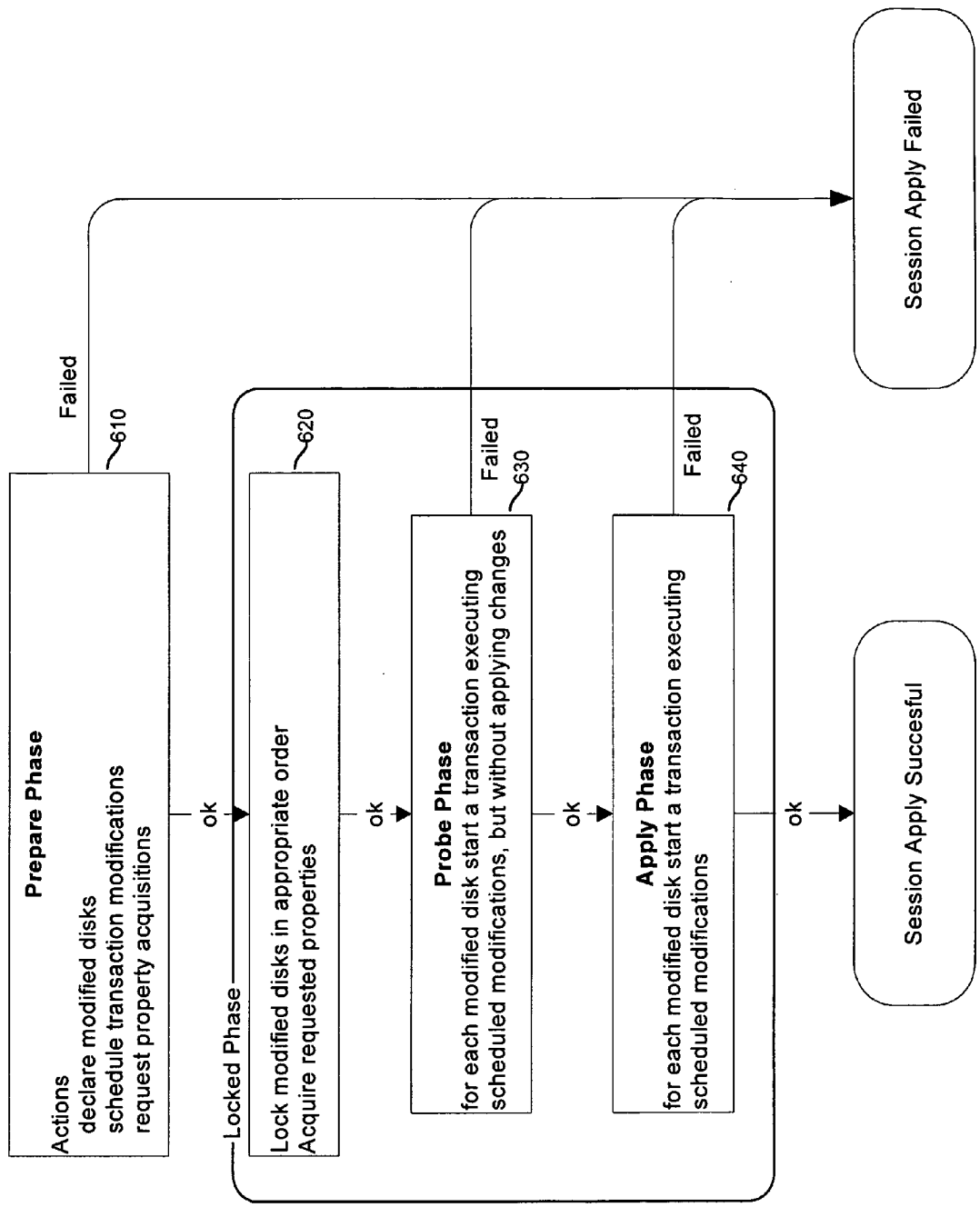
FIG. 6 is a flow diagram illustrating a technique for executing series of partition table modifications according to an embodiment of the invention.
Figure 7:
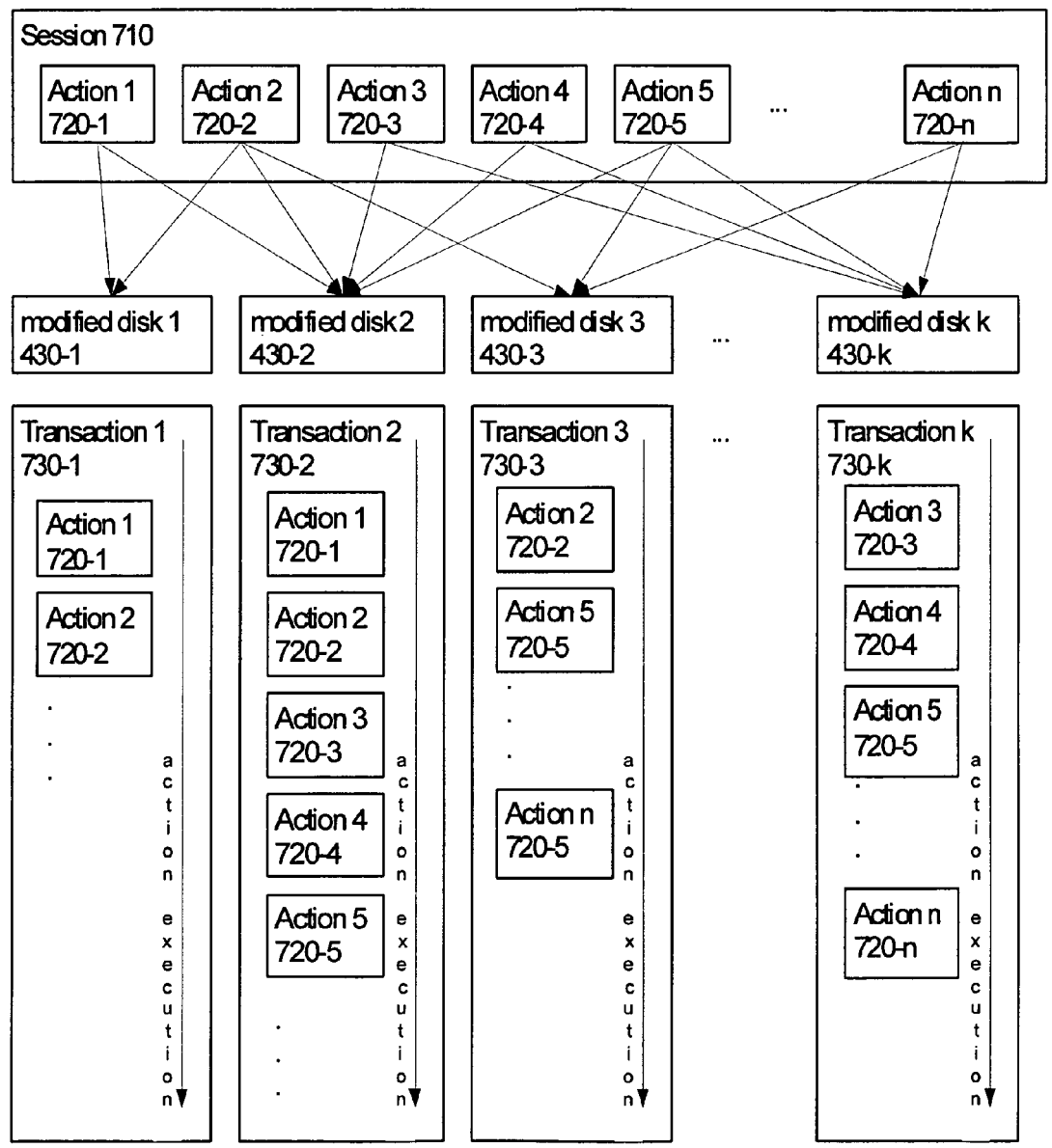
FIG. 7 is a diagram showing dispatching relevant session actions to transactions performed on each of the modified disks according to an embodiment of the invention.

FIG. 6 is a diagram illustrating different phases associated with a session apply according to an embodiment of the invention. A session apply includes a prepare phase 610, a lock phase 620, a probe phase 630, and an apply phase 640.

Prepare Phase 610

Each session action 720 declares the disks 430 it will modify and for each modified disk 430 schedules appropriate modifications and requests property acquisitions (again see FIG. 7).

Modifications will be applied to the disks 430 in the transactional phases (probe phase 630 and apply phase 640). If an action 720 modifies a volume it will request volume input/output to be blocked for the session's lifetime, asking for exclusive access to Volume I/O property.

Lock Phase 620

The lock phase 620 involves locking disk partition table areas 192 and acquires properties requested during the prepare phase 610.

Figure 9:
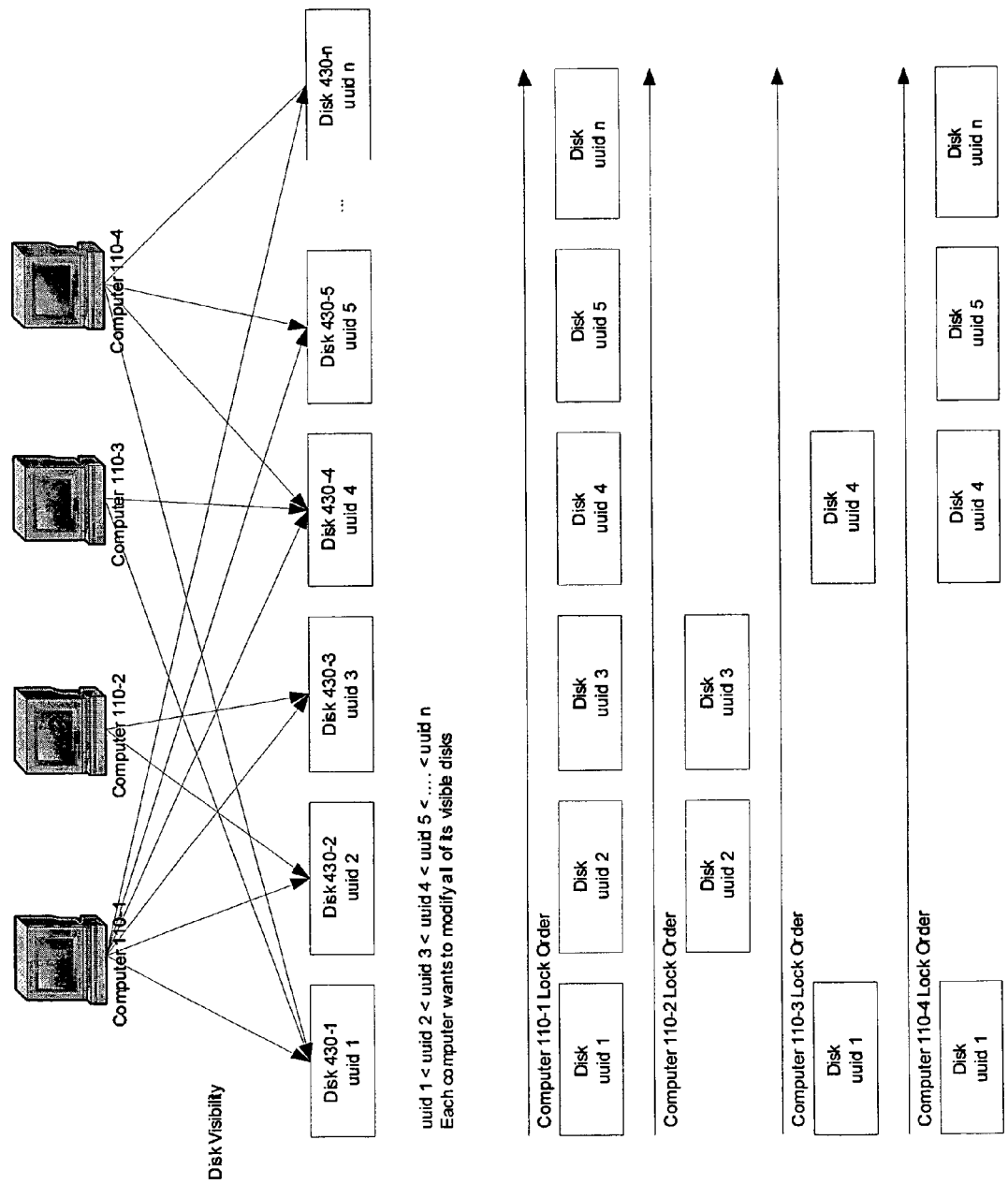
FIG. 9 is a flowchart illustrating a technique of locking disk partition tables according to an embodiment of the invention.

Before applying its actions, each session 710 exclusively locks the partition table areas 192 on the disks 430 it will modify. FIG. 9 is a diagram illustrating disk lock order according to an embodiment of the invention. Deadlock is prevented if all computers 110 in the cluster 145 lock the disks 430 in the same order. The locking phase prevents other computers 110 in the cluster 145 from accessing (reading or writing) the partition table area so they'll have to wait until the session modifications 720 are applied and session 710 releases the locks. Obtaining a lock on a region of shared storage is illustrated more particularly in related applications.

As discussed, a UUID is assigned on each disk 430 managed by the volume manager 130. When a session 710 modifies multiple disks 430, it locks them in ascending UUID order (as in FIG. 9). (Locking them in descending or any other order from all the computers 110 in the cluster 145 will also work fine.) As discussed, this prevents deadlock and allows only one session 710 at a time to proceed to transactional phases (e.g., Probe 630 and Apply 640 phases). Serializing sessions 710 provides cluster 145 wide logical layout consistency.

In the lock phase 620, after locking the modified disks 430 in appropriate order, the volume manager 130 acquires the properties requested in the prepare phase. Properties control Volume 200/Physical Partition 220/PartitionSet 210 behavior cluster wide.

The acquired partition locks and properties are held for the next two session phases (e.g., probe phase 630 and apply phase 640) so that no other computers 110 access and/or modify pertinent disk partition tables 192.

Probe Phase 630

For each modified disk 430, the volume manager 130 starts a transaction 730 in which to perform the pertinent metadata modifications 720 (again see FIG. 7). Changes 720 to be made to the disk partition tables 192 are applied locally in computer memory. If an error arises during the Probe Phase 630, the volume manager 130 terminates the session 710 and passes an appropriate error code to the user. If the Probe Phase 630 is successful, it guarantees that the following Apply Phase 640 (of modifying the actual disk partition tables 192 on disks 430) will be successful, too. In this way, the volume manager 130 gives the user a feeling of an atomic session 710.

Apply Phase 640

For each modified disk 430, the volume manager 130 starts a transaction 730 in which to perform the pertinent disk modifications 720. During this phase, transactions 730 are executed on disks 430 of the shared storage 180 as in FIG. 7. Errors in this phase 640 are very unlikely to arise, since all modifications 720 have been successfully executed in the Probe Phase 630. Only low memory or disk or network disappearing can cause this phase to fail.

After the apply phase 640, the volume manager 130 releases locks on the disk partition table 192 areas. In one embodiment, the order of releasing disk partition table area locks doesn't matter. This gives other computers access to the disk partition tables 192, which are now in a consistent state. The acquired Volume/PhysicalPartition/PartitionSet properties are also released.

Properties

Volume/PhysicalPartition/PartitionSet Property—a piece of Volume/Partition/PartitionSet Address Space 810. Each property has own meaning. Each computer accessing the shared storage can acquire each property and subsequently loose it. A property acquisition or losing on each computer triggers actions defined by the property meaning (semantics).

A property can be acquired by a computer shared or exclusive. All cluster members 110 can acquire shared a property at the same time, unless a cluster member 110 acquires the property exclusively. When a property is acquired exclusively, only one computer 110 can own it. When a property is acquired exclusively, all cluster members that have shared access to the property lose their property rights.

The Volume/PhysicalPartition/PartitionSet Address Space 810-264, limits the maximum property count per Volume/PhysicalPartition/PartitionSet (FIG. 8).

Using properties associated with each shared storage unit the computer accessing the shared storage can communicate about certain events associated with the given storage unit, thus providing a consistent view of the shared storage to each of the computers having access to it.

Physical Partition & Partition Set properties

Life—while the property is acquired shared successfully by a cluster member, the in memory PhysicalPartition/PartitionSet representation is allowed to exist and function normally (—giving access to PhysicalPartition/PartitionSet disk area); when the property is lost (—a cluster member has acquired it exclusively) the PhysicalPartition/PartitionSet representation is disabled and removed, thus disabling the access to the PhysicalPartition/PartitionSet disk areas. This way PhysicalPartition/PartitionSet life is controlled cluster wide.

Volume Properties

Life—while the property is acquired shared successfully, the device 460 representing the volume to the OS is operational and allows normal volume input output if not restrained by other factors; when the property is lost the volume input output is disabled and the in memory device 460 is prepared to be removed. This allows cluster wide control of the volume representation to the OS.

IO—while the property is held shared, the input output operations flow normally; when the property is lost the input output operations are pended until the property is acquired again shared; thus allowing volume I/O control in the whole cluster.

Disk Partition Table Change Notification

When a session 710 is applied, its actions 720 will result in changes to the corresponding disk partition tables 192. In order to register the changes applied to the partition table 192, each computer 110 in the cluster 145 registers a shared lock 1020 covering the partition table area 192. When a computer 110 in the cluster 145 makes a change to the disk partition table 192, the Lock Phase 620 acquires an exclusive lock 1010 over the partition table area 192, thus breaking all shared locks 1020 over the partition table area 192 of all other computers 110 in the cluster 145. When such a shared lock 1020 is broken, the volume manager 130 schedules a reread of the changed partition table 192. Before reading the disk partition table 192, the volume manager 130 initiates a shared lock 1020 over the disk partition table 192 to ensure that there are no disk partition table changes made at this time. The shared lock 1020 is held until a partition table change is started. Thereafter, the shared lock 1020 is lost and scheduled again. When the shared lock 1020 is obtained again, the change has been made. The volume manager 130 then reads the disk partition table 192 of the modified disk 430 to learn of any changes. Each volume manager 130 in the cluster 145 has a shared lock 1020 over the partition table 192 of each one of the managed disks 430. By loosing these shared locks 1020 over the partition table 192 of a managed disk 430 the cluster members 110 know that this disk 430 has been modified. (see FIG. 10)

Figure 10:
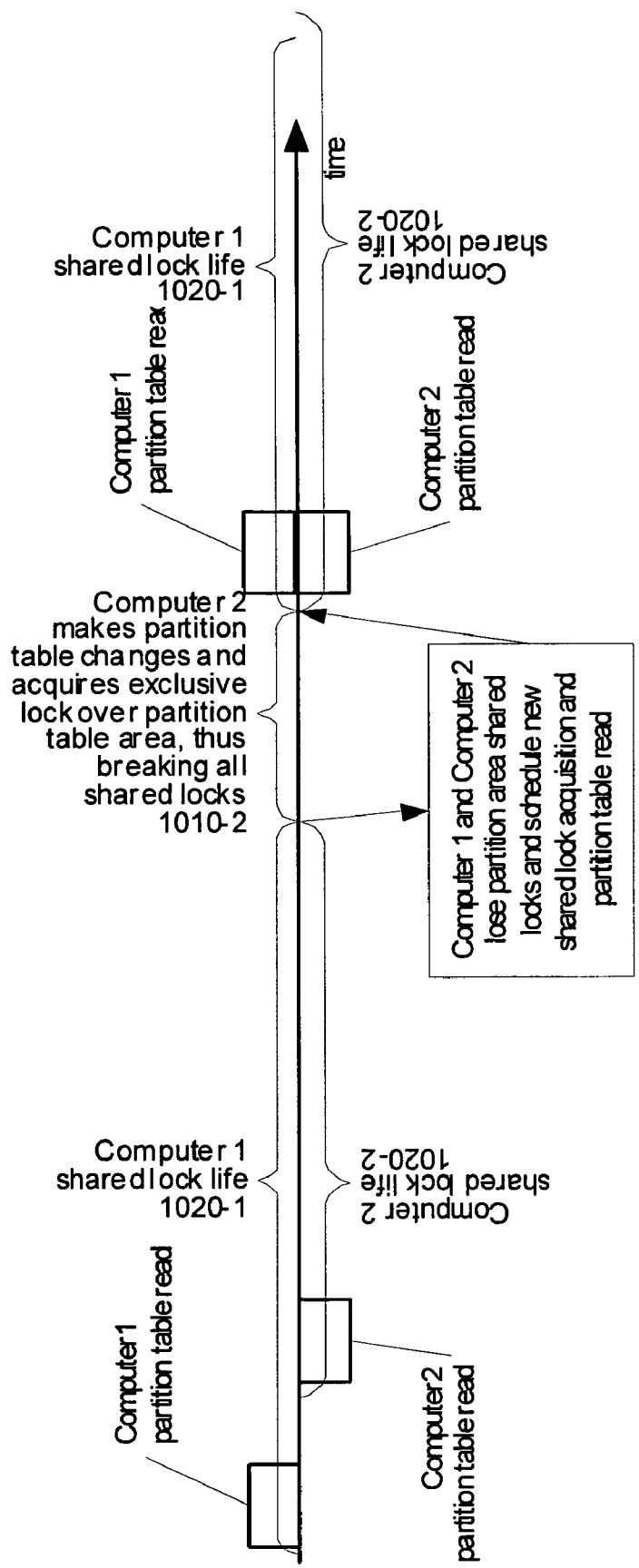
FIG. 10 is a flowchart illustrating a disk partition table change notification according to an embodiment of the invention.

FIG. 10 is a diagram illustrating notification of an updated disk partition table 192 according to an embodiment of the invention. As shown, prior to exclusive lock 1010 of disk partition storage areas, both computers 1 and 2 have shared locks 1020. After computer 2 acquires an exclusive lock 1010 and modifies the partition table area 192, both computers again have shared locks 1020 again. Upon detecting a change from no access to shared access 1020, the affected computers (e.g., computer 1 and 2) read the disk partition table 192 to obtain any updated information. Thus, a coherent view of the shared storage is provided to all computers having access to it.

Security

The volume manager application provides per user and per computer access control to the shared volumes it' manages, allowing a volume administrator to clearly define which computers can access a particular volume and which users can perform certain volume management commands on each volume. This is achieved by using security permissions assigned to security identifiers associated either with a computer or a user grouped in a security descriptor stored along with each volume.

Security permissions can be applied to a volume only and not to disks, partitions, mirrors, stripes, etc. Each volume has a security descriptor (stored as its metadata) defining users' access to the volume. The following user rights are defined: Machine Read Access, Machine Write Access, Resize. Change Default Letter, Delete, Read Permissions, Change Permissions.

The first two rights (Machine Read Access, Machine Write Access) are machine user rights. A machine user is a user account associated with each machine that has access to the shared storage. It is used by the volume manager for identifying the computer that it's running on and weather this computer has access to the specified volume.

The other rights are user rights assigned to users who make volume changes (e.g. perform volume management commands).

In general, this is the method for restricting machine and user access to volumes. In other words, the volume manger provides control of each user and each computer access to each shared volume.

Enhanced Data Transfer

The volume manager application provides efficient volume input/output handling by enhancing data transfer on multiple disks by minimizing number of requests directed toward each storage unit using page aligned buffers and transfer offsets. A stripe set implementation is used as an example to describe the aforementioned method.

Stripe set or RAID 0 is usually defined as non-redundant collection of striped drives. A RAID 0 configuration doesn't provide data protection. However, it does offer very high data throughput, especially when data is transferred in large chunks.

Prior art stripe set implementations define the stripe length 32 KB/64 KB/128 KB and so on, in contrast the invented enhanced stripe set implementation allows the stripe length to be much smaller (e.g., a page size of 4 KB or multiple thereof).

When a prior art stripe set implementation receives an I/O request, it splits the buffer in multiple stripe length sized buffers. Then it (the prior art stripe set) creates the same number of requests, assigning each buffer to a request, and directing requests to the each partition in the stripe set.

new_request_count=buffer_size/stripe_len+(buffer_size % stripe_len?1:0)

Figure 11:
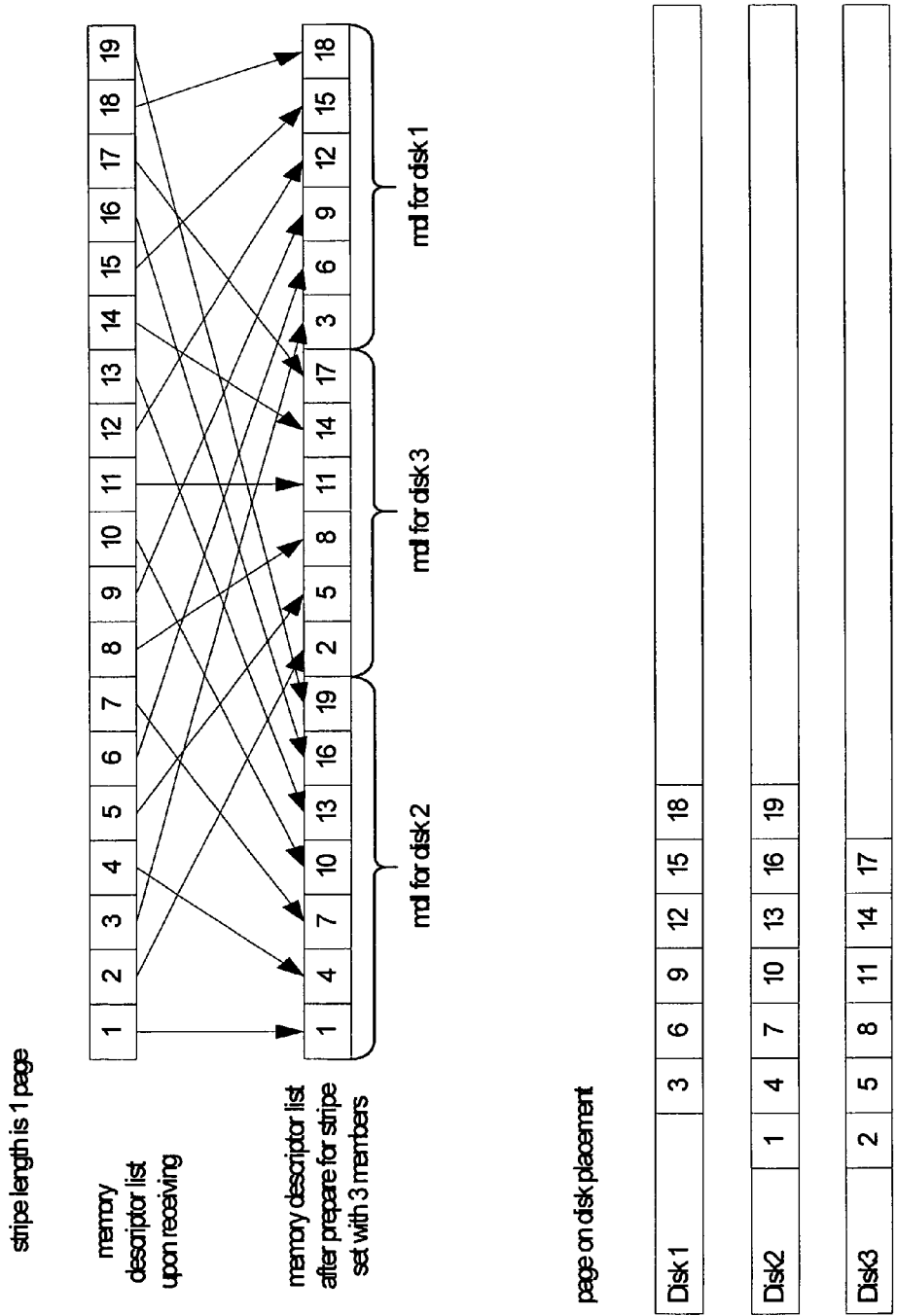
FIG. 11 is a diagram illustrating an example of how an enhanced stripe set input/output is performed according to an embodiment of the invention.

Thus, when large buffers (e.g., which results when buffer_length>stripe_length*stripe_set_members_count) are transferred, the disks 190 on which the partitions reside can be overloaded by stripe set generated requests. The requests that a disk 190 receives, when a large buffer is transferred, are on contiguous disk areas. The disk hardware associated with a respective disk 190 can handle these requests much faster than if they were merged in one, because the performance penalty for processing all those requests individually (e.g., transferring small amounts of data from a contiguous disk area) is greater than the processing of a single request, transferring the whole needed data at once. This is the goal of the enhanced stripe set implementation: to create just one request for each stripe set member. This is illustrated in FIG. 11.

new_request_count=min(stripe_set_mebers, buffer_size/stripe_length)

The invented enhanced stripe set implementation declares bytes per sector to be PAGE_SIZE or multiples thereof, thus receiving requests that have page aligned buffer sizes and offsets on the disk.

declared_bps=ceil(max(PAGE_SIZE,disk.geometry.bytes_per_sector), PAGE_SIZE)

Algorithm description:
stripe_len–stripe length in bytes
members_count–set members count
buf_lens[members_count]–array containing buffer lengths directed to each disk, initially zeroed
page_count=buffer_length/PAGE_SIZE;
pages_per_stripe=stripe_len/PAGE_SIZE;
start_index=(offset/stripe_len) % members_count; –set member that receives the first buffer chunk 1. Determine buffer pages to which stripe set member belong

```
offset_in_first_chunk = offset%_stripe_len;
len_done = buf_lens[start_index] =
   min(_stripe_len-offset_in_first_chunk, len);
pages_in_first_chunk = buf_lens[start_index]/PAGE_SIZE ;
current_stripe_index = start_index;
for (i=0; i<pages_in_first_chunk; i++)
   page_stripe_index[i] = current_stripe_index;
for (i=pages_in_first_chunk; i<page_count; i+=j)
{
  if (current_stripe_index<members_count-1)
     current_stripe_index++;
  else
     current_stripe_index=0;
  for (j=0; j<pages_per_stripe && i+j<page_count; j++)
  {
     page_stripe_index[i+j] = current_stripe_index;
     buf_lens[current_stripe_index]+=PAGE_SIZE;
     len_done+=PAGE_SIZE;
  }
}
buf_lens[current_stripe_index]- = len_done-buffer_length;
```

2. Reorder pages

There is no need to reorder pages if their count is one; There will be at least one page, since the declared bytes per sector is PAGE_SIZE multiple.

```
reordered_pages[page_count] — array containing reordered pages
Pages — array containing original pages
for (member=start_index; member<members_count; member++)
   for (j=0; j<page_count; j++)
      if (_page_stripe_index[j]==member)
         reordered_pages.append(Pages[j]);
for (member=0; member<start_index; member++)
   for (j=0; j<page_count; j++)
      if (_page_stripe_index[j]==member)
         reordered_pages.append(Pages[j]);
Pages=reordered_pages;
```

3. Split them in mdls

```
members[members_count]- set members
buf_offset= 0; // offset in main buffer
action_offset = offset/_stripe_len/members_count*_stripe_len;
// create sub buffers for start_index
start_offset = action_offset+offset_in_first_chunk;
members[start_index] issues request at start_offset creating sub
buffer from the main buffer at offset buf_offset with length
buf_lens[start_offset]
   buf_offset+=buf_lens[start_offset];
// create sub buffers from start_index+1 to members_count
for (i=start_index+1; i<members_count; i++)
   if (buf_lens[i])
   {
      members[i] issues request at action_offset creating sub buffer
from the main buffer at offset buf_offset with length buf_lens[i]
      buf_offset+buf_lens[i];
   }
action_offset+=_stripe_len;
// create sub buffers from 0 to start_index
for (i=0; i<start_index; i++)
   if (buf_lens[i])
   {
      members[i] issues request at action_offset creating sub buffer
from the main buffer at offset buf_offset with length buf_lens[i]
      buf_offset+=buf_lens[i];
   }
```

FIG. 11 illustrates the above enhanced transfer algorithm applied an IO operation directed to a 3 disk stripe set where the stripe length is 1 page.

Figure 12:
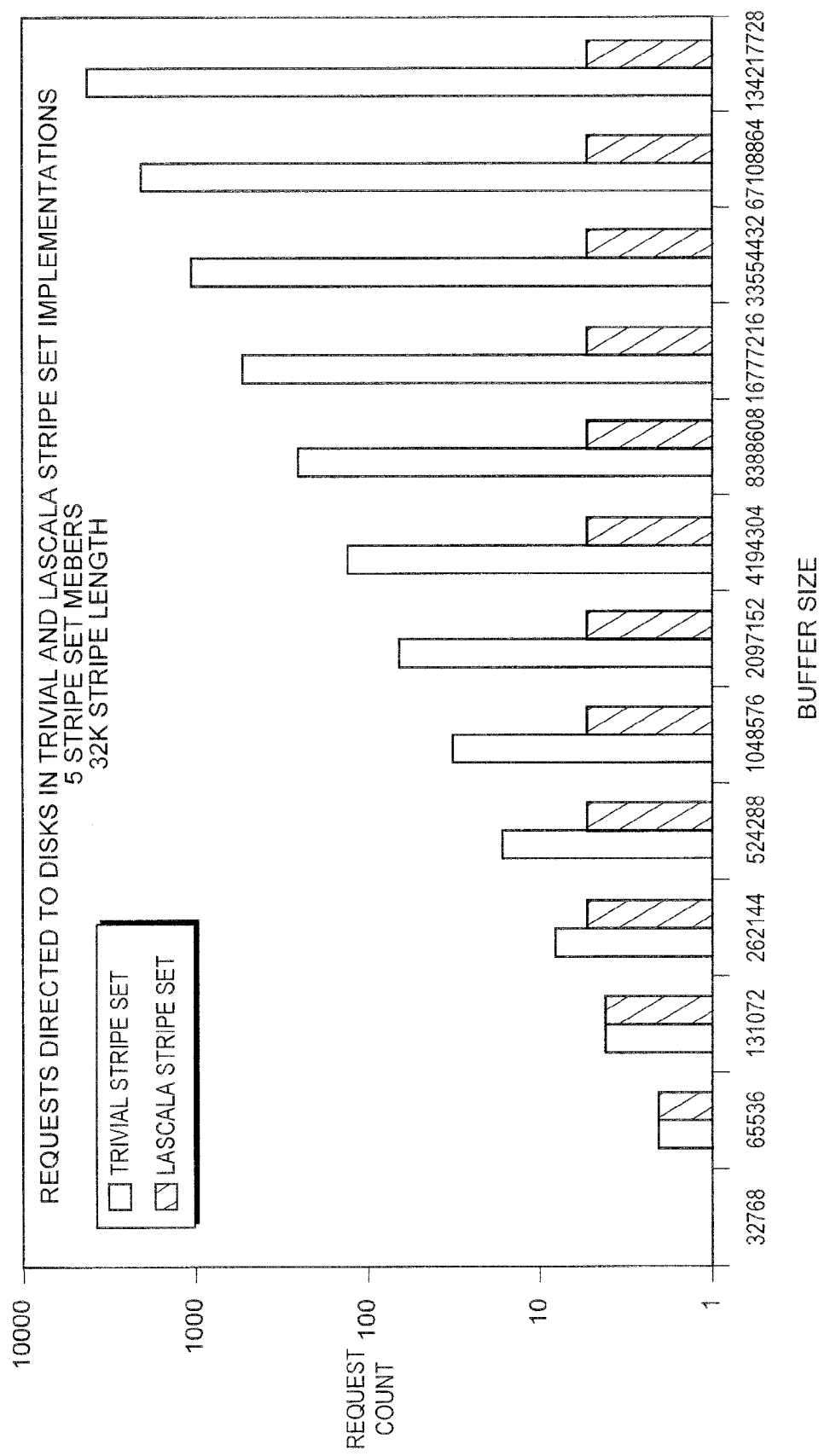
FIG. 12 illustrates a comparison of the number of requests directed to the members of a stripe set in a prior art stripe set implementation and a stripe set implementation, using the invented enhanced transfer method according to an embodiment of the invention.

Prior art stripe set implementations perform best when they operate with buffer sized equal or smaller to stripe length multiplied by stripe set member count;

prior art stripe set best performance–
buffer_length<=stripe_length*stripe_set_members_count In comparison, when operating with small buffers (buffer_length<=stripe length*stripe set_members count) the invented enhanced stripe set performs just as a prior art implementation best case, the bigger the buffer is the higher the invented enhanced stripe set performance will be. FIG. 12 show clearly the invented enhanced stripe set performance advantages. With buffer growth a prior art stripe set implementation will flood with requests the disks, while the invented enhanced stripe set performance will remain optimal—just one request per disk.

The aforementioned enhanced stripe set transfer method, minimizing the minimizing number of requests directed toward each storage unit using page aligned buffers and transfer offsets can be used for improving other RAID's (e.g. RAID 1, RAID5, etc.) performance.

Figure 13:
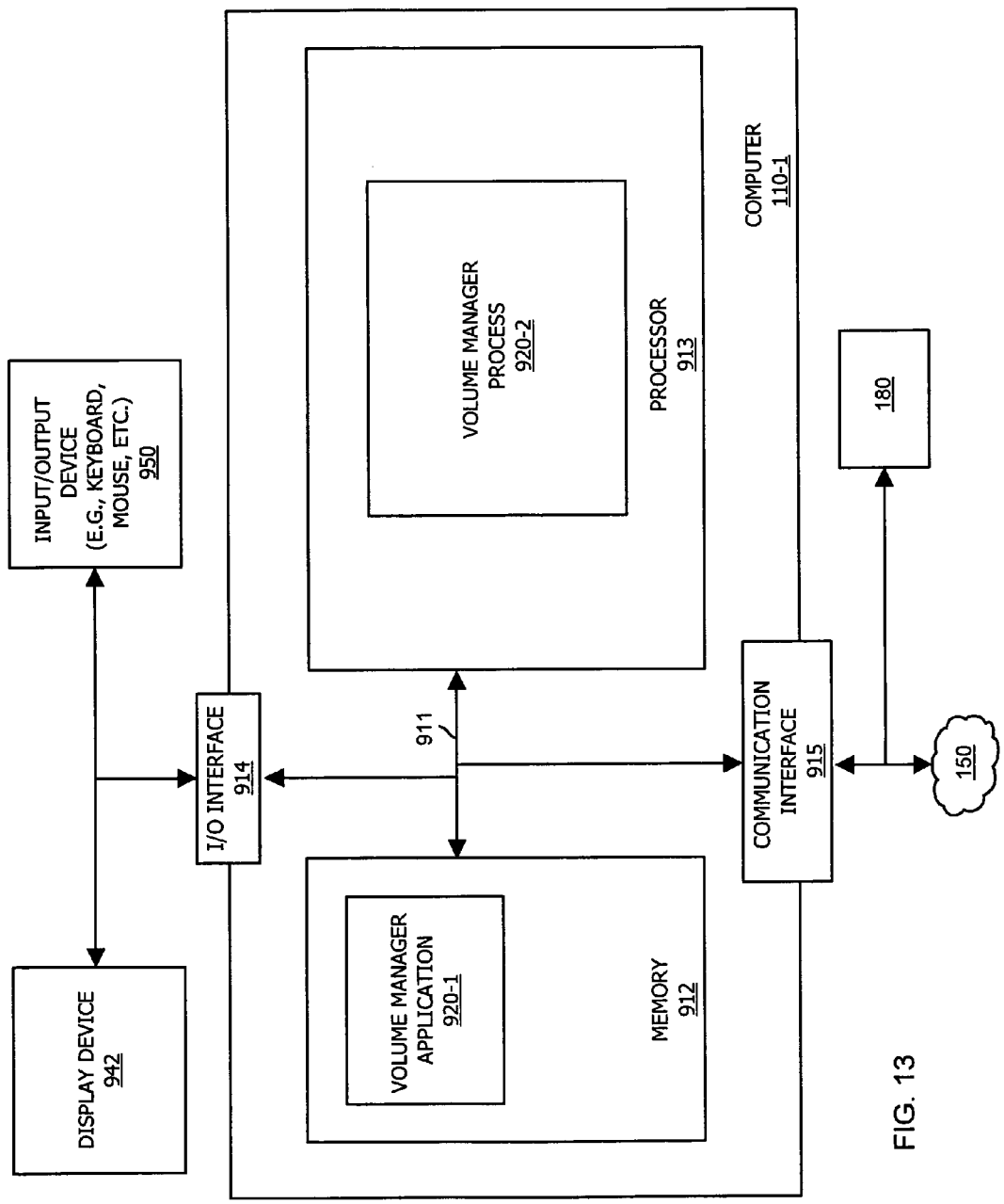
FIG. 13 is a sample architecture for executing a volume manager according to an embodiment of the invention.

FIG. 13 is a block diagram illustrating an example architecture of computer system 110 in cluster 145 according to embodiments of the invention. Computer system 110 may be a computerized device such as a personal computer, workstation, portable computing device, console, network terminal or the like. As shown, computer system 110 of the present example includes an interconnect 911 that couples a memory system 912, a processor 913, an input/output interface 914, and a communication interface 915 to network 150. Input/Output devices 950 (e.g., one or more viewer controlled devices such as a keyboard, mouse, etc.) couple to and provide commands to processor 913 through I/O interface 914. The input/output devices 950 enable a user such as an administrator at computer 110 to provide volume management commands to control volumes and corresponding volume configurations associated with the shared storage 180. Display device 942 provides information to a user of computer 110 and enables computer 110 to display information. Computer 110 couples to shared storage 180 via a respective link 151 (e.g., a fiber cable supporting high speed communications). Communications interface 915 enables computer system 10 (and corresponding user 108 at computer 110) to communicate with other computers in a cluster 145 via network 150.

As shown, memory 912 is encoded with volume manager application 920-1 supporting the functionality as discussed herein as well as in related applications. The volume manager application 920-1 may be embodied as software code such as data and/or logic instructions (e.g., code stored in the memory or on another computer readable medium such as a disk) that supports processing functionality according to different embodiments of the invention as described. During operation, processor 913 accesses memory 912 via the interconnect 911 in order to launch, run, execute, interpret or otherwise perform the logic instructions of the volume manager application 920-1. Execution of volume manager application 920-1 produces processing functionality in volume manager process 920-2 (a.k.a., volume manager 130 as discussed above). In other words, the volume manager process 920-2 represents one or more portions of the volume manager application 920-1 (or the entire application 920-1) performing within or upon the processor 913 in the computerized device 110. In a similar vein, computer 110 also supports functionality associated with other modules discussed above.

General functionality supported by computer system 110 according to embodiments of the invention will now be discussed with respect to flowchart 1300 in FIG. 14 as discussed above in connection with respect to FIGS. 1 through 13.

FIG. 14 is a flowchart 1300 of processing steps performed by volume manager 130 (e.g., volume manager process 920) according to an embodiment of the invention. In general, flowchart 1300 illustrates how volume manager application 920 manages one or more volumes in shared storage 180. Note that the discussion of FIG. 14 will include occasional references to techniques as discussed in the previous figures.

In step 1305, the volume manager 130 in computer system 110 having access to disks 190 in the shared storage system 180 (e.g., a SAN) identifies at least one disk 190 in the shared storage system 180 associated with a particular volume.

In step 1310, the volume manager 130 then receives a volume management command associated with the particular volume.

In step 1315, in response to receiving the volume management command, the volume manager 130 initiates temporary disablement of computers 110 in cluster 145 from accessing portions of the disks 430 associated with the particular volume.

In step 1320, while applications currently running on the computers 110 are temporarily disabled from accessing the volume (such as its content stored therein) and/or its metadata such as disk partition tables 192, the volume manager 130 modifies corresponding disk partition tables 192 associated with the disks 430 in shared storage 180 associated with the volume to execute the volume management command. The corresponding disk partition tables 192 include configuration information indicating which physical portions of storage on the respective disks 430 are associated with the particular volume. In accordance with this embodiment, a volume manager 130 can manage volumes while other computers 110 in the cluster 145 appear to have uninterrupted access to the particular volume and related metadata in the shared storage system 180.

FIG. 15 is a flowchart 1400 illustrating a more specific set of processing steps performed by volume manager application 920 according to an embodiment of the invention. Note that FIG. 15 includes functionality that overlaps with the technique discussed in FIG. 13.

A given computer 110 (having a network connection to communicate with other computers 110 on a network 150 and an interface to access contents of the shared storage system 180) is one of multiple computers 110 having access to volumes in the shared storage system. The given computer 110 runs a volume manager application 920 that manages (e.g., can modify) a volume of logical storage (e.g., physical storage on multiple disks 430) associated with the shared storage system 180. The volume associated with the shared storage 180 is accessible by multiple computers 110 in cluster 145 having access to the shared storage system 180.

In step 1405, during the process of volume management, the volume manager 130 retrieves disk partition tables 192 from respective disks 430 in the shared storage system 180. The disk partition tables 192 include configuration information indicating which, if any, portions of the respective disks 430 are associated with the volume. The disk partition tables 192 also identify which, if any, portion of physical storage on a respective disk 190 is associated with other volumes as well. In other words, volumes in the shared storage 180 can include application data stored on physical storage partitions from multiple disks 192 in the shared storage system 180.

In step 1410, the volume manager 130 identifies one or more disks 430 in the shared storage system 180 associated with the volume based on contents of the disk partition tables 192.

In step 1415, the volume manager 130 in a respective computer 110 receives a volume management command (or commands) associated with the volume.

In step 1420, based on receipt of this type of volume management command, the volume manager 130 identifies a corresponding need to modify at least one of the disk partition tables 192 (e.g., disk partition tables associated with the volume). In one embodiment, a disk partition table 192 includes metadata identifying which volume each partition (e.g., portion of storage) of the corresponding disk 430 pertains.

In step 1425, in the course of executing the command, the volume manager 130 initiates temporary disablement of other corresponding computers 110 in a cluster 145 from accessing portions of the at least one disk 430 associated with the volume and/or the disk partition tables 192 of disks 430 associated with the volume. Prior to accessing contents in shared storage system 180, the computers have mounted the volume (e.g. have access to the volume).

In step 1430, while applications currently running the computers 110 are temporarily disabled from accessing the volume, the volume manager 130 modifies corresponding disk partition tables 192 associated with one or more disks 190 associated with the affected volume as a result of executing the volume management command.

In step 1435, after modifying the corresponding disk partition tables 192, the volume manager 130 initiates (e.g., communications) re-enablement of the multiple computers 110 so they can again access portions of the disks 430 associated with the existing volume.

In one embodiment as in step 1440, the volume manager 130 provides notification to the other computers 110 (which have access to the volume) of modifications to the corresponding disk partition tables 192 occurring in response to executing the volume management command.

The volume manager application 920 (e.g., volume manager 130) and corresponding techniques as described herein can be used in enterprise and high performance shared storage system 180 environments such as SANs (Storage Area Networks) including RAID (Redundant Arrays of Inexpensive Disks) type storage configurations. In further embodiments, the volume manager application 920 herein can be extended to support concepts such as advanced locking for volume management on the fly, volume management for faster and less interrupted access to files, complete SAN-NAS integration, maintenance of volumes associated with disks in shared storage, etc. The volume management techniques also herein can be used in conjunction with other applications such as the transaction manager, journaling, oplock and cluster manager application, etc. Principles discussed in these related applications can be employed to exploit the volume manager of the present application. For example, techniques such as locks on disk partition tables 192 prevent other computers from accessing the tables while the tables are modified by a respective volume manager 130.

Figure 16A:
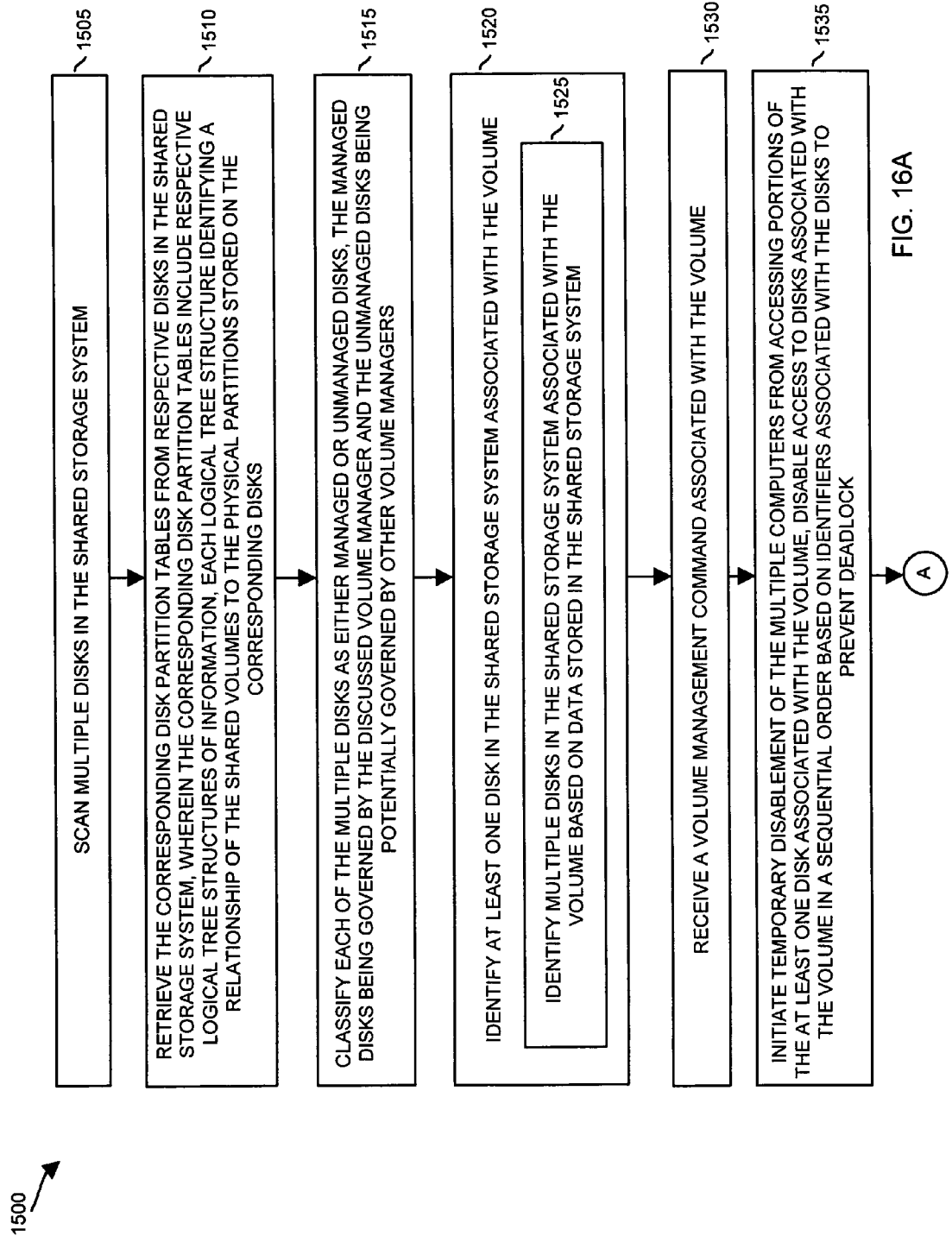
FIGS. 16A and 16B combine to form a flowchart illustrating operations according to an embodiment of the invention.
Figure 16B:
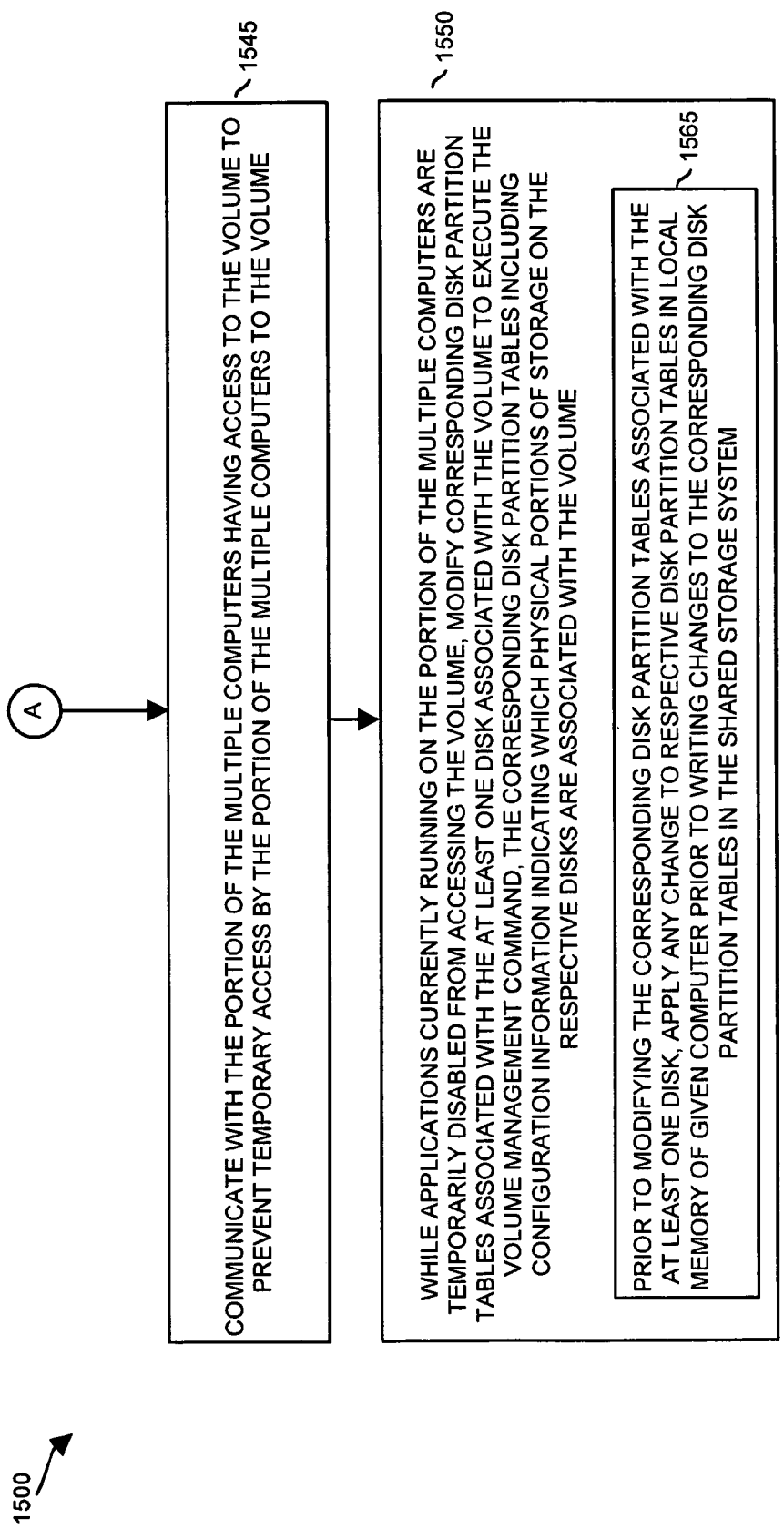

FIGS. 16A and 16B combine to form 1500 illustrating a more specific set of processing steps performed by volume manager application 920 according to an embodiment of the invention. Note that FIG. 16 includes functionality that overlaps with the techniques previously discussed.

In step 1505, the volume manager 130 in a computer 110 scans multiple disks in the shared storage system.

In step 1510, the volume manager 130 classifies each of the multiple disks 190 as either managed or unmanaged disk. For example, from the perspective of a volume manager 130 having access to the shared storage system 180, managed disks are those disks 192 governed by the volume manager 130 (e.g., the discussed volume manager) and the unmanaged disks being potentially governed by other other volume managers.

In step 1515, the volume manager 130 retrieves disk partition tables 192 from respective disks 190 in the shared storage system 180. The disk partition tables include respective logical tree structures of information, each tree structure identifying a relationship of a shared volume to the physical partitions stored on the corresponding disks.

In one embodiment, the disk partition tables in respective disks of the shared storage system include respective tree structures of configuration information. Each tree structure identifies a volume relationship to the physical partitions of a respective disk. Thus, a combination of one or more disk partition tables identify how physical partitions of the disks are associated with volumes in the shared storage system.

In step 1520, as a result of scanning and retrieving disk partition tables 192 from respective disks 430 in shared storage 180, the volume manager 130 identifies which disks 192 in the shared storage 180 have at least one physical partition associated with a volume based on data in the shared storage system 180 and, more particularly, the disk partition tables 192. Because there are potentially many disks 190 in the shared storage system 180, it is quite possible that a volume is associated with only a portion of disks 430 in the shared storage system 180.

In step 1530, based on input from a user or administrator, the volume manager 130 receives a volume management command associated with a volume.

In step 1535, in the course of executing the command, the volume manager 130 initiates temporary disablement of the multiple computers 110 from accessing portions of the at least one disk 430 associated with the volume. In one embodiment, disablement involves communicating with the portion of the multiple computers 110 having access to the volume to prevent temporary access by the portion of the multiple computers 110 to the volume or its corresponding metadata (e.g., disk partition tables 192). In step 1535, the volume manager 130 disables access to disks partition tables 192 associated with the volume in a sequential order (e.g., an ascending order) based on identifiers associated with the disks 430 to prevent deadlock between multiple computers trying to modify overlapping sets of disk partition tables.

In step 1550, while applications currently running on the computers 110 are temporarily disabled from accessing the volume, the volume manager 130 modifies corresponding disk partition tables 192 of disks 430 associated with the volume to execute or carry out the volume management command. As discussed, the corresponding disk partition tables 192 associated with the disks and volume include configuration information indicating which physical portions of storage on the respective disks 192 are associated with the volume.

In step 1565, prior to modifying the corresponding disk partition tables 192 associated with the at least one disk 430, the volume manager 130 applies any changes to respective disk partition tables 192 in local memory (e.g., in respective memory) of a given computer 110 prior to writing changes to the corresponding disk partition tables 192 in the shared storage system 180. This enables the volume manager 130 making the changes to check whether any such changes will be effective if and when they are actually applied to disk partition tables 192 in respective disks 430 of the shared storage 180. Thereafter, the volume manager 130 applies the changes to disk partition tables 192 in respective disks 430 of the shared storage 180.

Thus, according to embodiments of the invention, techniques recited herein allow concurrent management of a given volume as well as additional volumes associated with the shared storage system 180. For example, a given disk 190 in the shared storage system 180 can be partitioned to store data for multiple volumes. While access by a portion of computers 110 to a given volume associated with a disk 190 is disabled, other computers 110 can access other volumes associated with the given disk 190. In other words, an access lockout from a given volume on a disk 190 for a certain set of computers 110 does not restrict another set of computers from accessing other volumes associated with the given disk during the access lockout.

As discussed, techniques of the present application are well suited for use in processing applications in which multiple computers in a networked computer system communicate (e.g., arbitrate negotiate, coordinate, compete, etc.) amongst each other to coordinate access to the same regions (e.g., contents of a volume or metadata associated with a volume) of shared storage 180. The techniques of locking out other computers 110 having current access to a volume in shared storage 180 is well suited for enabling a volume manager 130 to update configuration information associated with the volume unbeknownst to the users accessing content stored in the volume. After modifying metadata associated with the volume, the volume manager 130 unlocks exclusive locks on the metadata to enable the user computers 110 to access the volume again. Thus, user computers 110 in a cluster 145 are not impacted by modification of the volume or corresponding metadata. For example, in one embodiment, the operating systems of such user computers 110 do not need to formally mount the volume again after modifications to the disk partition tables 192 in shared storage 180. It should be noted that embodiments of the invention are well suited for applications other than those discussed above and thus are not limited to such use.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. In a system in which a given computer is one of multiple computers having access to a shared storage system, a method of managing shared volumes of logical storage residing on one or more disks in the shared storage system, the shared volumes of logical storage being accessible by at least a portion of the multiple computers in addition to the given computer, the method comprising:

providing a coherent view of the shared volumes to the multiple computers having access to the shared storage system;

providing the multiple computers access to data in the shared volumes;

providing access control for each of the multiple computers to each of the shared volumes by ordering of disks in the shared volumes during initial formatting of disk partition tables defining a mapping of the disks to the shared volumes, the ordering indicating a locking order used by each of the multiple computers attempting to modify the shared volumes; and providing control of modifications each user can apply on each of the shared volumes by at least temporarily providing exclusive access to a selected volume for modification by the given computer based on sequentially applying exclusive locks to the disk partition tables in accordance with the locking order to prevent deadlock amongst any other computers attempting to simultaneously modify the selected volume.

2. A method as in claim 1, wherein providing the coherent view of the shared storage includes describing logical volumes of storage throughout multiple physical disks using:

universally unique identifiers for identification of disks, physical partitions, partition sets and volumes; and wherein each disk, physical partition, partition set and volume is assigned a universally unique identifier;

each volume being described by a logical tree structure in which:

i) a root element of the logical tree structure identifies a respective volume, ii) leaves in the logical tree structure identify physical partitions associated with the respective volume, and iii) nodes in the logical tree structure identify partitions sets of the respective volume.

3. A method as in claim 1, wherein providing the coherent view of the shared volumes of logical storage includes storing definitions of physical partitions, partition sets, and volumes in multiple physical disks where the definitions are stored in a partition table for each disk, the method further comprising:

on each disk, storing a path from each physical partition residing on a respective disk to a root of a logical tree to which the physical partition belongs.

4. A method as in claim 1, wherein providing the multiple computers access to the data in the shared volumes includes enhancing data transfer on multiple disks in the shared storage by minimizing the number of requests directed to each storage unit using page aligned buffers and transfer offsets, the method further comprising:

receiving an input/output request;

in response to the request, reordering pages in an input/output memory descriptor list;

splitting the memory descriptor list in at most one sub memory descriptor list for each disk; and for each sub memory descriptor list, creating an input/output request and sending the created input/output request to a corresponding disk.

5. A method as in claim 1, wherein providing a coherent view of the shared storage includes modifying multiple partition tables on corresponding disks in the shared storage while applying multiple user modifications in a session using a transaction on each modified disk of the shared storage, which is accessible by at least a portion of the multiple computers in addition to the given computer, the method comprising:

receiving multiple user modifications;

storing the multiple user modifications in a session in the computer memory;

when the session is applied by a user, each of the user modifications generates at least one action to be applied to at least one disk, each action specifying at least one disk that a respective action will modify;

scheduling a transaction for each modified disk;

locking modified disk partition table areas to serialize sessions modifying overlapping sets of disks;

for each executed transaction, performing all actions in a respective session that have requested modification of the corresponding disk; and releasing the locks, acquired during the locking step, to allow other computers to detect changes to the corresponding disk and, if needed, apply other sessions.

6. A method as in claim 5 wherein locking modified disk partition table areas includes:

ordering the modified disks using the universally unique identifier, assigned to each disk during initial formatting;

sequentially applying an exclusive lock to each partition table area using the ordered modified disks to disable access of the other computers in the cluster to locked partition table areas and prevent deadlock amongst other computers attempting to modify overlapping sets of disks at the same time.

7. A method as in claim 6 wherein the session is applied so that changes applied by a session appear to be atomic to a user, monitoring the shared storage, and either all user modifications in a session are applied or none of the user modifications are applied, the method further comprising:

a probe phase in which, for each modified disk, a transaction is executed performing the corresponding modifying actions locally in computer memory;

if an error arises during the probe phase, terminating the execution of the session and generating an appropriate notification to the user; as a result none of the modifications will be applied to any of the disks; and an apply phase in which, if the probe phase is successful for each modified disk, a transaction is executed performing the corresponding modifying actions on the disk.

8. A method as in claim 1, wherein providing the coherent view of the shared volumes includes providing computer-independent identification of logical and physical shared storage space, the method further comprising:

mapping a physical disk space into the unified address space of the corresponding disk using a predetermined region of the unified address space;

mapping a physical partition address space in the unified address space of the disk on which the physical partition resides;

utilizing the partition table entry index to determine where the physical partition address space maps in the disk's unified address space; and mapping the address space of a complex storage unit (a volume or a partition set) in the unified address spaces of the disks on which the storage unit resides, the corresponding partition table entry index being used to determine where the complex storage unit's address space maps in the corresponding disk's unified address space.

9. A method as in claim 1, wherein providing the coherent view of the shared volume includes notifications to multiple computers accessing the shared volume of logical storage, the method further comprising:

enabling each of the multiple computers to monitor a unified address space area by holding a notification lock which is a weak shared lock over a specified area;

when a computer needs to modify data in the specified area, enabling the computer to obtain a strong exclusive lock, forcing all weak shared locks to be lost and notifying corresponding users of lost weak shared locks.

10. A method as in claim 9 further comprising:
enabling each of the multiple computers having access to the shared storage system to initiate respective notification locks of areas that corresponding computers wish to monitor in a reserved disk space region mapped in the unified address space;
when modifying the disk via executing a transaction, enabling a respective computer to obtain appropriate rights over modified regions in the reserved disk space region mapped in the unified address space of the corresponding disk, causing notification locks to be broken with other computers and triggering a lost action on each computer holding a notification lock.

11. A method as in claim 10 for monitoring a presence of changes to a disk partition table associated with a disk being modified, wherein initiating respective notification locks results in a lock over the partition table area in the reserved disk space region mapped in the disk unified address space.

12. A method as in claim 9 for simultaneous removal of a storage unit computer representation (a physical partition or a partition set or a volume computer in memory representation) from all computers having access to the removed item, the method comprising:
enabling a given computer to access a storage unit (e.g. have a representation of the storage unit in the computer memory, enabling the computer to read from and write to the respective storage unit) after taking a notification lock for an area in the storage unit's address space, which is mapped in the corresponding disk's unified address space;
for a storage unit spanning on multiple disks (a partition set or a volume), for each disk on which the storage unit spans, requiring that a notification lock be held in a respective area in the storage unit's address space, which is mapped in the corresponding disk's unified address space;
when a storage unit is to be deleted, for each disk on which the storage unit spans, requiring that a strong exclusive lock be initiated by the computer performing the delete, over a respective area in the storage unit's address space, which is mapped in the corresponding disk's unified address space;
when a notification lock held for a storage unit is lost, removing the corresponding in memory representation from the respective computer on which the loss occurs.

13. A method as in claim 9 that provides simultaneous volume input/output disablement and enablement on all computers having access to the specified volume, the method comprising:
in order a volume input/output to flow normally, for each disk on which the volume spans a notification lock is held over an area (designated for volume input/output) in the volume address space, which is mapped in the corresponding disk's unified address space;
in order to disable volume input/output on all computers having access to the volume, requiring that a computer obtains a strong exclusive lock over a respective area in the volume address space, which is mapped in the corresponding disk's unified address space;
when a computer loses a notification lock held for a volume input/output, the computer starts queuing all incoming requests for the volume in a request queue instead of executing them, thus disabling the access to the volume data;
when the notification lock for the volume input/output is held again, the computer executes all pending requests and all new incoming requests to enable access to the volume.

14. A method as in claim 1 for restricting user access rights to modify the configuration of a given volume in the shared storage system based on a security descriptor associated with the given volume, the method comprising:
before performing a user action to modify a volume, loading a security descriptor associated with the volume;
verifying that the security descriptor indicates that the respective user associated with the user action has a right to perform the specified user action;
if the user doesn't have the right to perform the user action, preventing the respective user from modifying the given volume;
if the user has the right to perform the specified user action, enabling the user to perform the requested volume modification.

15. A method as in claim 1 for restricting computer access to a given volume residing on at least one disk of the shared storage system, the given volume being accessible by at least a portion of the multiple computers in addition to the given computer, the method comprising:
assigning a security identifier to each computer having access to the shared storage system;
when a computer has to determine if it has a right to access a given volume residing in one or more disks in the shared storage system, enabling the computer to check the volume security descriptor stored in the volume description information to determine whether the computer has any access rights to the given volume, the volume description information being stored in the partition tables of the respective disks on which the volume resides;
if any access is granted to the computer, enabling software applications running on the computer to view the given volume in a respective manner according to the granted rights; and
if access is not granted to the computer, preventing software applications running on the computer from viewing the given volume.

16. A method as in claim 1 further comprising:
maintaining the disk partition tables in the shared storage system, the disk partition tables being conditionally accessible by each of the multiple computers depending on a presence of locks to the disk partition tables;
forwarding disk partition table information associated with the selected volume from the shared storage system over a network to the given computer,
based on exclusive locks to the disk partition tables by the given computer and after the given computer locally modifies the disk partition table information in the given computer, receiving modifications made by the given computer to the disk partition tables associated with the selected volume; and
updating the disk partition tables in the shared storage system associated with the selected volume based on the modifications received from the given computer.

17. A method as in claim 16, wherein providing the exclusive access includes disabling computers other than the given computer from accessing the disk partition tables associated with the selected volume while the given computer locally modifies the disk partition information, the exclusive lock being implemented based on the multiple computers communicating amongst each other over a network to access the disk partition tables, the method further comprising:

after the given computer provides notification over the network to other computers regarding the modifications to the disk partition tables associated with the selected volume, providing the updated disk partition tables to the multiple computers.

18. In a given computer which is one of multiple computers having access to a shared storage system, a method of managing a volume of logical storage associated with the shared storage system, the volume being accessible by at least a portion of the multiple computers in addition to the given computer, the method comprising:

identifying at least one disk in the shared storage system associated with the volume;

receiving a volume management command associated with the volume;

initiating temporary disablement of the multiple computers from accessing portions of the at least one disk associated with the volume;

while computers other than the given computer are temporarily disabled from accessing the volume, modifying disk partition tables associated with the at least one disk to execute the volume management command, the corresponding disk partition tables including configuration information indicating which physical portions of storage on the respective disks are associated with the volume; and after execution of the volume management command, initiating notification to the portion of multiple computers other than the given computer of changes made to the corresponding disk partition tables associated with the volume.

19. A method as in claim 18, wherein identifying at least one disk includes:

identifying multiple disks in the shared storage system associated with the volume based on data stored in the shared storage system.

20. A method as in claim 18 further comprising:

scanning multiple disks in the shared storage system; and classifying each of the multiple disks as either managed or unmanaged disks, the managed disks being associated with the volume and the unmanaged disks not being associated with the volume.

21. A method as in claim 18 further comprising:

retrieving the corresponding disk partition tables from respective disks in the shared storage system for modification of the disk partition tables locally in the given computer; and wherein modifying the disk partition tables includes forwarding locally modified disk partition tables to the shared storage system for subsequent use by the multiple computers to access the volume in the shared storage system.

22. A method as in claim 21 further comprising:

in the given computer, keeping track of the multiple computers that have access to the volume prior to initiating the temporary disablement; and wherein initiating temporary disablement of the multiple computers from accessing portions of the at least one disk associated with the volume includes communicating from the given computer to the portion of multiple computers having access to the volume to prevent computers other than the given computer from accessing the volume while the given computer modifies the disk partition tables.

23. A method as in claim 22, wherein initiating notification to the portion of multiple computers includes:

via communications from the given computer to the portion of multiple computers having access to the volume, initiating re-enablement after modifying the disk partition tables so that the multiple computers can access the selected volume again via use of the modified disk partition tables.

* * * * *